US011754675B2

(12) United States Patent
Olson et al.

(10) Patent No.: US 11,754,675 B2
(45) Date of Patent: Sep. 12, 2023

(54) PRECURSOR BASED PENETRATING RADAR SYSTEM

(71) Applicant: University of Florida Research Foundation, Inc., Gainesville, FL (US)

(72) Inventors: Timothy Edward Olson, Deland, FL (US); Scott Keith Lindsey, Deland, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 1051 days.

(21) Appl. No.: 16/279,711

(22) Filed: Feb. 19, 2019

(65) Prior Publication Data

US 2022/0291375 A1    Sep. 15, 2022

Related U.S. Application Data

(60) Provisional application No. 62/632,212, filed on Feb. 19, 2018.

(51) Int. Cl.
    *G01S 7/41*    (2006.01)
    *G01S 13/88*   (2006.01)
    *G01S 7/292*   (2006.01)

(52) U.S. Cl.
    CPC ............ *G01S 7/414* (2013.01); *G01S 7/2921* (2013.01); *G01S 7/411* (2013.01); *G01S 13/88* (2013.01); *G01S 13/887* (2013.01); *G01S 13/888* (2013.01)

(58) Field of Classification Search
    CPC ................................ G01S 7/414; G01S 13/888
    See application file for complete search history.

(56) References Cited

U.S. PATENT DOCUMENTS

| 8,570,207 B1* | 10/2013 | Dawood ................. G01S 13/89 342/179 |
| 2009/0180466 A1* | 7/2009 | Soul ........................ H04B 7/10 375/267 |
| 2009/0303103 A1* | 12/2009 | Winstead .............. G01S 13/103 342/89 |
| 2016/0211856 A1* | 7/2016 | Muhammad ........ H03M 1/1255 |
| 2017/0290011 A1* | 10/2017 | Kushnir .................. G01S 7/006 |

OTHER PUBLICATIONS

Kurt Oughstun "Dynamical evolution of the Brillouin precursor in Rocard-Powles-Debye model dielectrics" (Year: 2005).*

* cited by examiner

*Primary Examiner* — Timothy A Brainard
*Assistant Examiner* — Helena H Seraydaryan
(74) *Attorney, Agent, or Firm* — Thomas | Horstemeyer, LLP

(57) ABSTRACT

Various examples are provided related to penetrating radar based upon precursors. In one example, a method includes transmitting a radio frequency (RF) signal; and receiving a return signal associated with the RF signal, where the return signal is a precursor having no exponential decay. The precursor can be one of a sequence of precursors, which can be used to improve resolution of the system. The RF signal can be a short pulse generated by an RF front end, without automatic level control. The return signal can be processed without filtering.

19 Claims, 9 Drawing Sheets

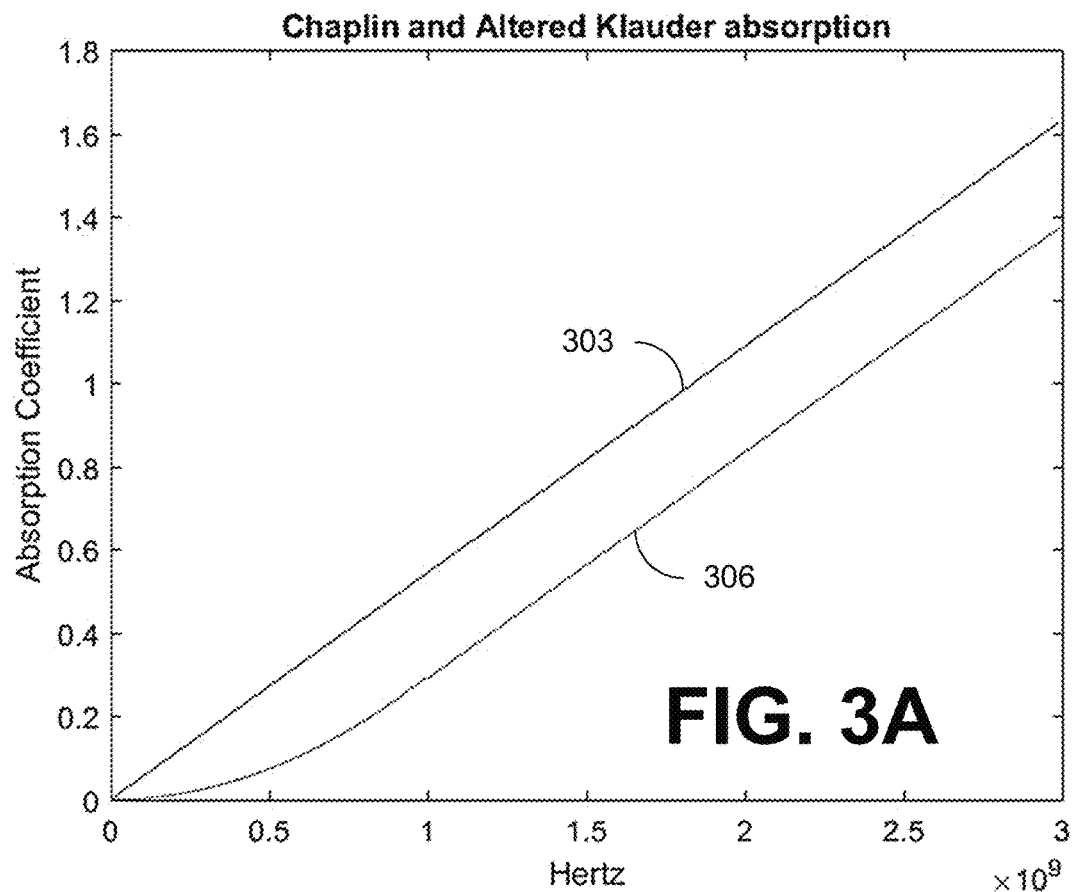
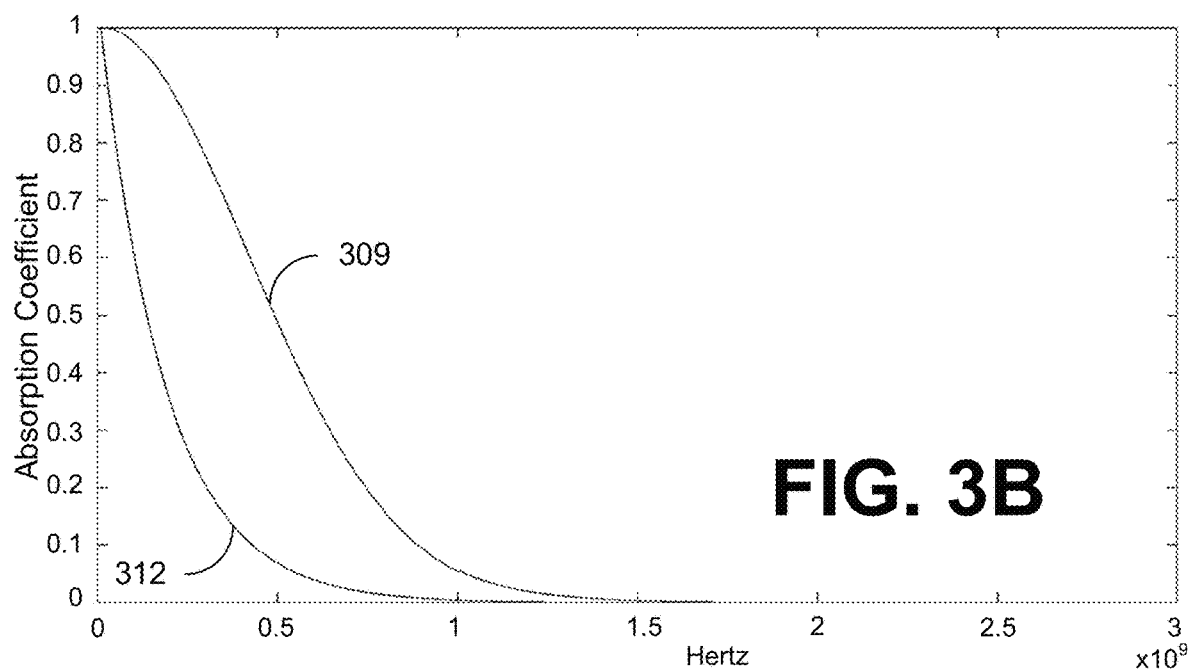

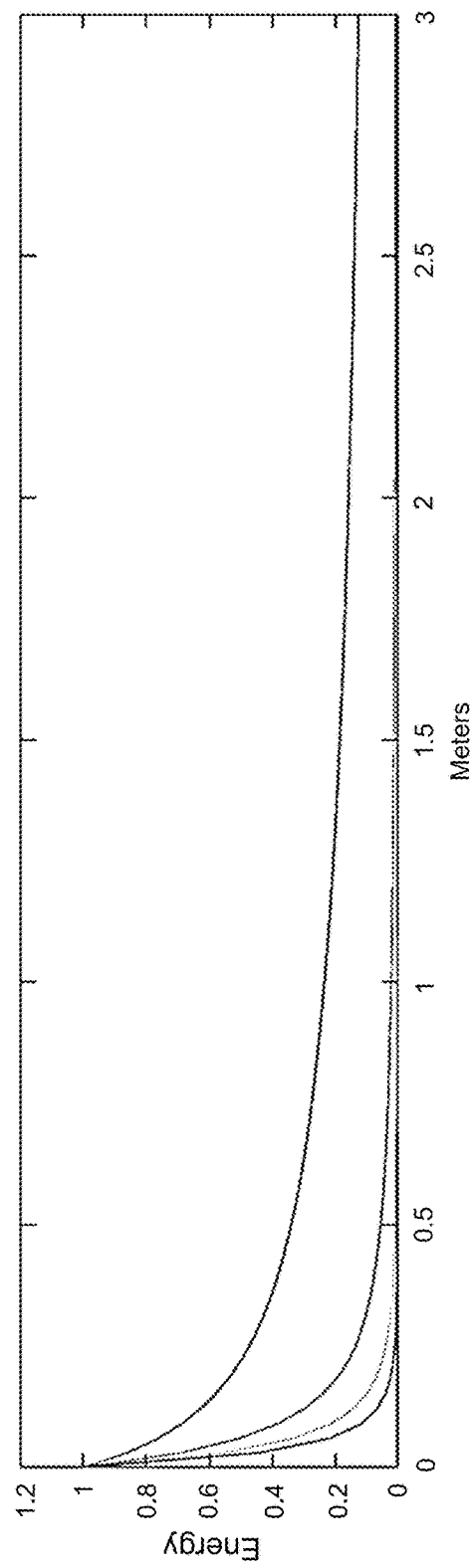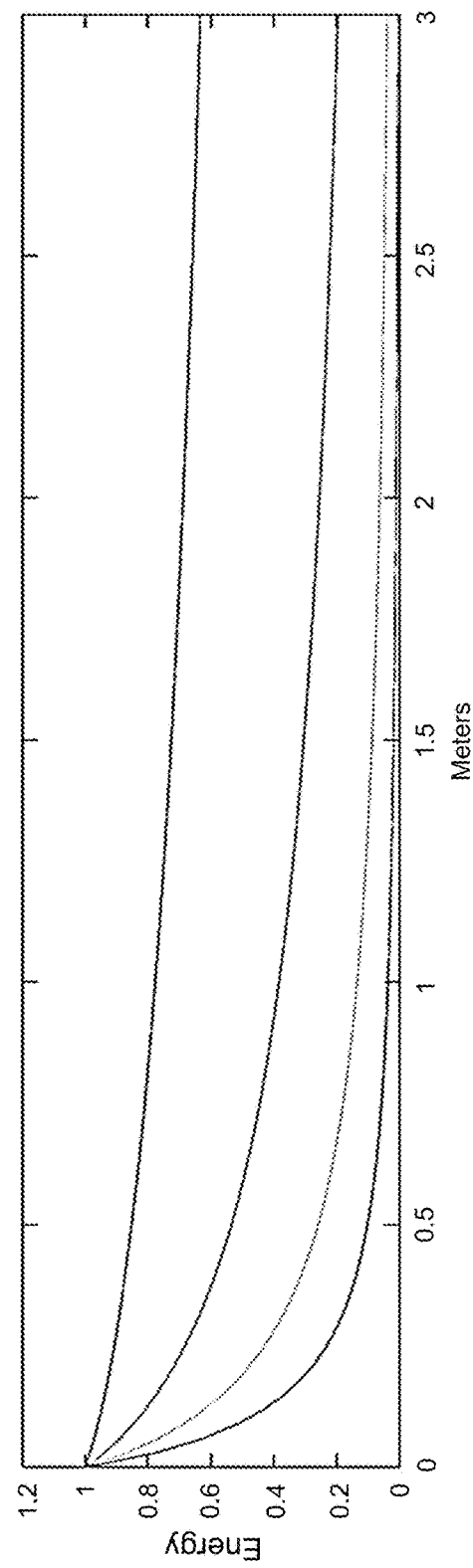

PRECURSOR BASED PENETRATING RADAR SYSTEM

CROSS REFERENCE TO RELATED APPLICATIONS

This application claims priority to, and the benefit of, U.S. provisional application entitled "Precursor Based Penetrating Radar System" having Ser. No. 62/632,212, filed Feb. 19, 2018, which is hereby incorporated by reference in its entirety.

STATEMENT REGARDING FEDERALLY SPONSORED RESEARCH OR DEVELOPMENT

This invention was made with government support under contract number HR0011-93-3-823, agreement number D19AP00009, awarded by the U.S. Department of Defense/DARPA. The government has certain rights in the invention.

BACKGROUND

Radar sensing is utilized in a number of military, agricultural and other applications. There have been a number of attempts toward foliage penetration, however the absorbing dispersive effects of foliage make this very difficult. One limitation of any approach is the size of the antennae, which is dictated by the submitted waveforms. Achieving good resolution and penetration, while having an antennae that is reasonably sized is a very complicated problem. Development of high resolution radar sensing of structures, individuals and other items under foliage continues on an ongoing basis.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A and 3B illustrate examples of absorption curves and transfer functions for water suggested by Chaplin and Klauder models, in accordance with various embodiments of the present disclosure.

FIGS. 4A-4B and 5A-5B illustrate examples of decay rates and inverse powers of the first four singular vectors generated using Chaplin and Klauder models, in accordance with various embodiments of the present disclosure.

DETAILED DESCRIPTION

Figure 1:
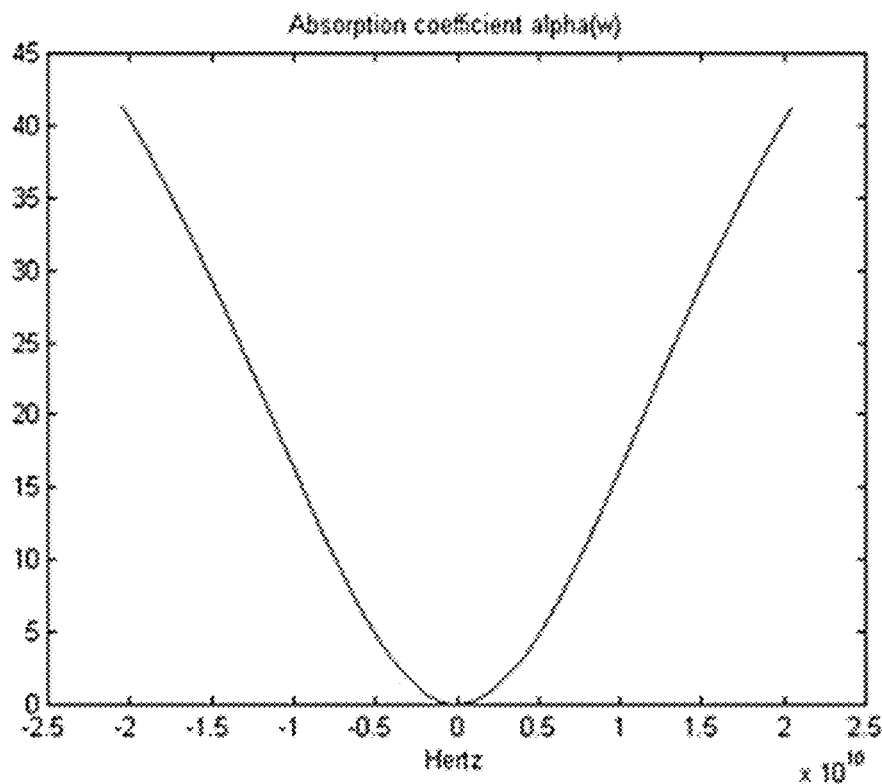
FIG. 1 is a plot illustrating an example of a measured absorption coefficient for water, as a function of frequency.

Disclosed herein are various examples related to penetrating radar based upon precursors. Precursors and sub-precursors can be used via a coherent radar processing algorithm to produce resolution on the order of inches, not feet or meters. This enables the development of radar systems for the penetration of a variety of media such as, e.g., foliage or buildings. The implications for the design of modern electromagnetic systems seem very substantial. To maintain a power budget within a system, ignoring methods utilizing the precursor phenomenon would seem unwise. Reference will now be made in detail to the description of the embodiments as illustrated in the drawings, wherein like reference numbers indicate like parts throughout the several views.

Precursors were first explained in 1914 by Sommerfeld and Brillouin where they examined the transmission of a square-windowed sinusoid through an absorbing and dispersive media. These pulses were analyzed with respect to causality. The precursor was troubling at the time because if one uses the group velocity for the measurement of speed, the pulse dominated by precursors will exceed the speed of light. It was concluded that the leading edge of the Sommerfeld precursor travels at the vacuum speed of light, rather than the expected speed in the media, but is absolutely causal. Similarly, the Brillouin precursor tends to have a majority of its energy at the leading and corresponding trailing edges of the pulse and is causal. The result of this analysis was that the Brillouin precursor decays at a rate of $O(z^{-1/2})$, as opposed to the normal exponential attenuation $O(e^{-kz})$. Exponential attenuation is expected from the solution of the most basic of differential equation which models absorption, $y'=-ky$. Precursors similar to those presented by Sommerfeld and Brillouin are the dominant singular vectors for compact operators associated with the particular physical models. These precursors can be derived as the dominant singular vectors of an appropriate compact operator, using methods of linear operator theory.

In this disclosure, the transmission operator is examined as a compact operator, and from this analysis the generated structure is very informative. The inputs and outputs to the operator are separated into orthogonal subspaces, with the power passing through each subspace clearly described by the singular vectors and values. Brillouin precursors, or pulses remarkably similar to Brillouin precursors, are the dominant singular vectors associated with transmission through media such as foliage or water using techniques of operator theory and linear algebra. It can be shown that while all of the other singular vectors decay faster, no singular vector decays at an exponential rate. Under the general condition that the absorption coefficient of the material decays to zero at the origin at a rate of $O(z^{-\beta})$, the $k^{th}$ singular value will decay at a rate of $O(z^{-(2k+1)/2\beta})$. The results not only support those of Brillouin, but introduce a whole new class of "precursors".

In addition, it can be shown that there are an infinite number of "precursors", in the sense that there are an infinite number of orthogonal functions which are not exponentially attenuated. These "precursors" are the singular functions of the compact operator associated with the transmission of a short pulse through a dispersive and absorptive media. These singular functions are shown to asymptotically converge to the Legendre polynomials. The result of this asymptotic singular value decomposition is that no causal function will decay exponentially through the standard physical models which are considered, or in any realistic models where the signal is causal.

Consider the following theorem:

Theorem 1 (The Singular Value Decomposition for Absorbing Media). Let $L_z$ be the compact operator associated with transmitting a short pulse through a uniform dispersive and absorbing medium of length z. Then for each distance z, the operator $L_z$ will have a singular value decomposition $$L_z(f) = \sum_{k=0}^{\infty} \sigma_k^z \langle f, \psi_k^z \rangle \phi_k^z.$$

If the absorption coefficient $\sigma(w)=O(w^\beta)$ in a neighborhood about the origin, then $\sigma_k^z=O(z^{-(2k+1)/2\beta})$. Moreover, $\|\psi_k^z(t)-P_k(t)\|_2 \to 0$, where the $P_k(t)$ are the Legendre polynomials on the interval [0,1].

Assume that there is only one "pass-band" about the origin. The classical Lorentz model utilized by Brillouin and Sommerfeld has two pass-bands yielding a low-frequency precursor, the Brillouin precursor, and a high-frequency precursor, the Sommerfeld precursor. For simplicity, the model in this disclosure yields only the low-frequency Brillouin precursor. Similar analysis with a more complicated model will yield additional precursors, if more "pass-bands" are included in the model.

Beginning with the historical origins, Brillouin and Sommerfeld worked together in 1913, concerned about the concepts of group velocity and causality. In this situation causality means that no transmitted signal exceeds the speed of light. It had been observed that when group velocity was used to determine the speed of a pulse, some pulses traveled at a speed which exceeded the speed of light. It can be shown that the first precursor, referred to as the forerunner, travels at the vacuum speed of light but is absolutely causal, in that it does not exceed the speed of light. The problem with causality is the definition of group velocity. There is another function whose group velocity travels at a speed which is above that of the expected speed of light in the medium. This Brillouin precursor follows the Sommerfeld precursor, both in understanding and time. This precursor, or forerunner, comes after the Sommerfeld precursor, and is also not exponentially attenuated.

Interest in these pulses has centered on this non-exponential attenuation property, which diverges from all of the easy standards of mathematics and physics. The second forerunner, or Brillouin precursor, is attenuated at a rate of $$\frac{1}{\sqrt{z}} \exp\left(-\frac{2}{3}\rho\frac{\delta'}{c}z\right).$$

This is an exponential attenuation. Further examination reveals that $\delta'$ is a moving space-time coordinate, which is 0 at exactly the point of the maximum of the Brillouin precursor. Thus, there is one space-time coordinate where there is no exponential attenuation. The attenuation coefficient in frequency goes to zero as the frequency goes to zero. FIG. 1 illustrates an example of the absorption coefficient that was empirically measured for water, as a function of frequency. Notice that the absorption coefficient is nearly linearly dependent upon frequency, for larger w, but seems quadratic at the origin. Thus the model offers a close approximation for a wide variety of materials which are water dominated. Whether this is an anomaly, or there are functions that carry energies which are not exponentially attenuated even though every non-zero frequency is exponentially attenuated will now be examined. It may be shown that no causal signal, or no signal with a finite starting and ending point, is ever exponentially attenuated as $z\to\infty$.

Slepian and Pollack considered how much energy can a finite-time signal put through a finite-frequency window from the viewpoint of communications. In that work, singular functions of the joint time-frequency cut-off operators were derived, resulting in prolate-spheroidal wave functions. Operators which are similar, but more general than the joint time-frequency operator, are considered here. These operators are physically motivated by a wide variety of electromagnetic propagation problems.

Convolution operators which describe the evolution of a pulse r(t,z) through a homogeneous linear medium have a very simple form. Given an initial plane wave signal which is incident on a homogeneous medium, s(t), the pulse at time t and distance z can be appropriately modeled by $$r(t,z)=\int s(\tau)A_z(t-\tau)d\tau=L_z(s(t)). \quad (1)$$

Unless otherwise noted, all integrals are over the real line.

Convolution operators $L_z$ of the type of equation (1) have been studied and are understood. The Fourier transform diagonalizes the operator and the spectrum of the operator is the continuous Fourier transform of $A_z$, for any fixed distance z. A monochromatic signal s(t) transmitted at a frequency $w_k$, will be absorbed according the real part of the Fourier transform $\hat{A}_z(w_k)$. Dispersion is described by the complex portion of $\hat{A}_z(w_k)$. Appropriate physics generally dictates that the absorption and dispersion are heavily tied to each other. If the signal is monochromatic, or consisting of just one frequency, the real part of $\hat{A}_z(w_k)$ will give its absorption and the complex part of $\hat{A}_z(w_k)$ will give its space-time-displacement or dispersion from the normal signal velocity. When the signal is not monochromatic, then the resulting signal $r(t,z)\equiv r_z(t)$ has a Fourier transform which is the product of $\hat{A}$ and $\hat{s}$, i.e., $\hat{r}_z(t)=\hat{A}_z(w)\hat{s}(w)$.

Consider waves in a dispersive medium, where the velocity of propagation is not a constant, but strongly depends upon the frequency. The differential equation (y'=−ky) is no longer satisfied and must be replaced by a more complicated systems of equations, which include the model, the physical mechanism, etc. This distinction between a simple narrow-band formulation where the dispersion and absorption are constant, and a wide-band understanding is important to understanding this phenomenon.

Slepian and Pollack utilized the finite length of signals to alter the operator of type of equation (1). This alteration creates a compact operator, with a corresponding discrete set of singular values and singular vectors as opposed to the continuous spectrum of $L_z$. The setting of the compact operator allows one to shift from the amplitude of signals to the energy of signals. Consider pulses of finite length l, which by assumption will be non-zero only on the interval [0,l]. The corresponding new operators $L_z$ describe a finite pulse on [0,l] evolving through a distance z of a medium. Formally, the new type of operator can be given as $$r(t,z)=\int_{-\infty}^{\infty}s(\tau)A_z(\tau-t)d\tau=\int_{-\infty}^{\infty}s(\tau)\chi_l(\tau)A_z(t-\tau)d\tau=L_z(s(t)). \quad (1)$$

where $\chi_l(\tau)=1$ for $\tau\in[0,l]$, and is 0 otherwise. Thus the old kernel was $A_z(t)$ and the new kernel is $K_z(t,\tau)=\chi_l(\tau)A_z(t-\tau)$.

Note that if $A_z(t)$ is square integrable, then $K_z(t,\tau)$ will be square integrable in both variables. A basic result of functional analysis states that when a kernel of the type $K_z(t,\tau)$ is square integrable in both variables, the corresponding operator $L_z$ is a compact operator. This is stated clearly in the following Theorem 2 (The Hilbert-Schmidt Theorem). Let an operator L be defined by $$L(f)(t) = \int f(\tau) G(t,\tau) d\tau \quad (3)$$

and let $\|G(t,\tau)\|_2 < \infty$. Then L is a compact operator, and it follows that there exist orthonormal singular vectors and singular values $\{u_k\}$, $\{v_k\}$, and $\{\sigma_k\}$ such that $$L(f)(t) = \int f(\tau) G(t,\tau) d\tau = \sum_{k=0}^{\infty} \sigma_k \langle f, v_k \rangle u_k. \quad (4)$$

The values $\sigma_k$ are called the singular values and the vectors $\{v_k\}$ and $\{u_k\}$ are correspondingly called the input and output singular vectors. In addition, we have $\sigma_k u_k = L(v_k)$, or that $u_k$ is the image of $v_k$, with energy $\sigma_k$. Moreover, the energy of the singular values is exactly that of the kernel, or $$\int\int |G(t,\tau)|^2 dt d\tau = \sum_{k=0}^{\infty} \sigma_k^2. \quad (5)$$

Let's adopt the following notation. Considering a class of compact operators which deal with signals on [0,1], and are indexed by the propagation distance z, the kernels of these operators are referred to as $K_z$. Similarly, refer to the corresponding singular values as $\sigma_k^z$, where k is the index, and the output singular vectors as $u_k^z(t) \in L^2[0,1]$, and the input singular vectors as $v_k^z(t) \in L^2[R]$. Thus, k runs from 0 to $\infty$, and the necessarily positive singular values decrease by convention. The dominant input and output singular vectors are always $u_0^z$, and $v_0^z$. The transmission operator, without regard to the finite pulse length, is also referred to as $L_z$.

Much of the fascination with precursors is due to the fact that they propagate with an absorption rate which is $z^{-1/2\beta}$ rather than $e^{-kz}$. Assume that the absorption operator coefficient is of the type $\alpha(w) = \alpha |w|^\beta$, so that the real part of the transfer function, in frequency, is of the form $$\text{Re}(\hat{A}_z(w)) = e^{-\alpha|w|^\beta}$$

in a region about the origin. A simple proof that under a basic hypothesis the operator norm decays at a rate of $O(z^{-1/2\beta})$ will now be given. By the Hilbert-Schmidt theorem, it follows that the sum of the squared singular values similarly decays at a rate $O(z^{-1/2\beta})$, or that the energy carried by the operator decays at a rate $O(z^{-1/2\beta})$.

Theorem 3 (Asymptotic Operator Decay). Assume that propagation within a dielectric material is modeled correctly by equation (2). Assume further that the absorption coefficient $\alpha(w) \approx \alpha|w|^\beta$, where $\alpha$ is a positive constant. Then the energy of the kernels associated with propagation of a distance z, $K_z(t,\tau)$, decays at the rate $O(z^{-1/2\beta})$. Moreover, by the Hilbert-Schmidt Theorem, it follows therefore that the $l^2$ norm of the singular values also decays at a rate of $O(z^{-1/2\beta})$.

Proof. The proof is very straight forward manipulation of the integrals, since $$\int_{-\infty}^{\infty}\int_{-\infty}^{\infty} |K_z^l(t,\tau)|^2 dt d\tau = \int_{-\infty}^{\infty}\int_{-\infty}^{\infty} |\chi_l(t) A_z(\tau-t)|^2 dt d\tau \quad (6)$$

$$= \int_{-\infty}^{\infty}\int_{-l}^{l} |\chi_l(t) A_z(\tau-t)|^2 dt d\tau$$

$$= \int_{-l}^{l}\int_{-\infty}^{\infty} |A_z(\tau-t)|^2 d\tau dt$$

$$= \int_{-l}^{l}\int_{-\infty}^{\infty} |A_z(\tau)|^2 d\tau dt$$

$$= 2l \int_{-\infty}^{\infty} |A_z(\tau)|^2 d\tau.$$

Now the Fourier Isometry and equation (6) gives us that $$\|K_z^l\|^2 = 2l \int_{-\infty}^{\infty} |A_z(\tau)|^2 d\tau \quad (7)$$

$$= 2l \int_{-\infty}^{\infty} |\hat{A}_z(w)|^2 dw$$

$$= 4l \int_0^{\infty} e^{2\alpha(w)z} dw$$

$$= 4l \int_0^{\infty} e^{2\alpha w^\beta z} dw.$$

From the substitution $u^\beta = zw^\beta$, it follows that $du = z^{1/\beta} dw$. Substituting directly into equation (7) gives $$\|K_z^l\|^2 = 4l \frac{1}{z^{1/\beta}} \int_0^{\infty} e^{-2\alpha u^\beta} du = O(z^{-1/\beta}). \quad (8)$$

By taking a square root, we end up with the result that $\|K_z^l\| = O(z^{-1/(2\beta)})$.

The model for the Brillouin precursor specifies that $\alpha(w)$ or $k(w)$ in Jackson's notation, is $$\frac{w}{c} n(w) \equiv O(w^2).$$

This result, which implies that the energy in the kernel is $O(z^{-1/4})$, at first does not seem consistent with the Brillouin result which states that the amplitude of the signal decays as $O(z^{-1/2})$. This may be attributed to considering the energy of the pulse, or the corresponding energy of the operator. Brillouin and Sommerfeld were considering the amplitude of the pulses. The reason why the energy decays slower, is that in a causal dielectric the dispersion is tied to the absorption. Thus the amplitude is going down while the pulse is being dispersed. The energy is more widely spread because of the dispersion.

To illustrate the difference, Klauder's precursor approach can be used. Directly from a Lorentz model, it can be proven that the kernel of the operator is given by $$A_z(t) = \sqrt{\frac{a}{2\pi z}} \exp\left(\frac{-a(t - v^{-1}z)^2}{2z}\right).$$

From this it follows that if $f_0(t)$ is the transmitted signal, the signal at distance z is given by $$f_z(t) = \sqrt{\frac{a}{2\pi z}} \int e^{-as^2/2z} f_0(s+t-v^{-1}z) ds.$$

The square root prefactor illustrates the decay at a rate $O(z^{-1/2})$. Note that, by the nature of the Gaussian convolution kernel, the frequency response kernel will also be a Gaussian, and therefore the absorption will be $O(w^2)$.

By standard methods of calculus, however, it is easily shown that $\|A_z(t)\|_2^2 = \int |A_z(t)|^2 dt = O(z^{-1/2})$, which implies that the energy in the kernel $\|A_z(t)\|_2 = O(z^{-1/4})$. This is due to the fact that although the amplitude decreases at a higher rate $O(z^{-1/2})$, the pulse is being dilated, or the energy is being spread. The total energy is therefore decreasing at a rate which is slower than the amplitude decrease.

The Dominant Singular Vector and Brillouin Precursor-like Functions. It has been shown that the sum of the energy in the singular vectors, or the operator energy, decays at the rate $O(z^{-1/2\beta})$, if the absorption rate is $O(w^\beta)$ about the origin. This does not necessarily prove that one of the individual singular functions decays at this rate. Each individual frequency is exponentially attenuated. Because the rate of attenuation is variable, and goes to zero at the origin, it has been shown that the operator norm is not exponentially attenuated. This leaves open the question of whether there is one singular vector which is attenuated at a rate which is similar to that of the operator.

It will now be proven that there is a wide class of functions which decay at the rate $z^{-1/2\beta}$.

Theorem 4. Assume that propagation within a dielectric material is modeled correctly by equation (2). Assume further that the absorption coefficient $\alpha(w) \approx \alpha w^\beta$ in a neighborhood N of the origin, where $\alpha$ is a positive constant. Assume that the absorption coefficient is bounded away from 0 outside of N. Then the dominant singular vector for the operator will decay as $z^{-1/2\beta}$. Furthermore, any function $f(t) \in L^2[0,1]$ such that $\hat{f}(0) \neq 0$ will decay at this rate.

Proof. By definition the dominant singular vector carries more energy through the medium than any other function. It will be shown that the function $f(t)$ as defined above carries energy which only decays at a rate of $z^{-1/2\beta}$. It then follows that the dominant singular vector carries as much or more energy, and therefore must only decay at the rate $z^{-1/2\beta}$. Now consider the energy of the transmitted pulse $$r(z,t) = \frac{1}{\sqrt{2\pi}} \int f(x) A_z(t-x) dt$$

where the Fourier transform of the transfer function is $\hat{A}_z = \varepsilon^{-\alpha z |w|^\beta}$ in a region about the origin. By the Fourier isometry the energy of this signal is given by $$\int |r(z,t)|^2 dt = \int |\hat{f}(w)|^2 \exp^{-2\alpha z |w|^\beta} dw.$$

and by symmetry in frequency this reduces to $$\int |r(z,t)|^2 dt = 2 \int_0^\infty |\hat{f}(w)|^2 \exp^{-2\alpha z w^\beta} dw.$$

Using the change of variables $u^\beta = zw^\beta$, which implies that $du = z^{1/\beta} dw$ to get $$\int |r(z,t)|^2 dt = \frac{1}{z^{1/\beta}} \int_0^\infty \left|\hat{f}\left(\frac{u}{z^{1/\beta}}\right)\right|^2 \exp^{-2\alpha u^\beta} du.$$

As $z \to \infty$, $u/z^{1/\beta} \to 0$ so that $$\hat{f}\left(\frac{u}{z^{1/\beta}}\right) \to \hat{f}(0)$$

While this convergence is not uniform, it is uniform in a neighborhood about the origin. The exponential kernel dominates away from the origin such that $$\int |r(z,t)|^2 dt = O(1/z^{1/\beta})$$

which implies that $\|r(z,t)\|_2 = O(z^{-1/2\beta})$. Since there is one function with this behavior, the dominant singular vector must decay at no less of a rate. Thus the dominant singular vector decays at the rate $O(z^{-1/2\beta})$.

Obvious candidates for generating precursor behavior are Gaussians, or perhaps a hat function. Any positive function will satisfy the criteria for the theorem, and therefore will generate precursors. One concern is that any such function will leave a charge on the antennae. This may be taken care of in the typical scenario by separating positive and negative pulses by an appropriate distance so that they do not interact and cancel, and the net effect on the system is not injurious.

Decay of Subdominant Singular Vectors. It will now be shown that only the dominant singular vector decays at this rate. To begin, consider a basic property of orthonormal functions on a finite interval.

Theorem 5. Let $\{o_k(t)\}_k$ be any orthonormal basis for $L^2[a,b]$, and let $\{\hat{o}_k(t)\}_k$ be the respective Fourier transforms in $L^2(\mathbb{R})$. The quantity $$\sum_k |\hat{o}_k(w)|^2 \quad (9)$$

will be independent of w. Moreover there is a partition of unity, in the sense that $$\frac{2\pi}{b-a} \sum_k |\hat{o}_k(w)|^2 = 1.$$

Proof. Starting with equation (9), and using the fact that the functions $\{o_k\}_k$ are an orthonormal basis, the Pythagorean theorem gives $$\sum_k |\hat{o}_k(w)|^2 = \sum_k \left|\frac{1}{\sqrt{2\pi}} \int_a^b o_k(t) e^{iwt} dt\right|^2$$

$$= \frac{1}{2\pi} \int_a^b |e^{iwt}|^2 dt \quad (10)$$

$$= \frac{1}{2\pi}(b-a) = \left\|\frac{1}{\sqrt{2\pi}} e^{iwt}\right\|^2. \quad (11)$$

Next, recall some of the basics of the singular value decomposition. Considering the integral operators generated by the integral kernels $K_z(t,\tau) = \chi_I(t) A_z(\tau-t)$, recall that the Fourier transform of $A_z(t)$ is given by $\exp(-\alpha z|w|^\beta)$. The integral operators and their corresponding singular value decompositions can then be written as $$L_z(f)(t) = \int f(\tau)K_z(t,\tau)d\tau = \int f(\tau)\chi_l(t)A_z(\tau-t)d\tau$$
$$= \sum_{k=0}^{\infty} \sigma_k^z \langle f, \psi_k^z(t)\rangle \phi_k^z(t). \tag{12}$$

Now recall that the functions $\{\psi_k^z(t)\}_k$ are an orthonormal basis for $L^2[0,1]$. The singular functions can be arranged in descending order, or $\alpha_k^z \geq \sigma_{k+1}^z$, for all k.

Thus, via the Fourier isometry, it is know that $$\|L_z(\psi_k^z)\|^2 = \int |\hat{\psi}_k^z(s)e^{-\alpha z|w|^\beta}|^2 dw =$$
$$\int |\hat{\psi}_k^z(s)|^2 e^{-2\alpha z|w|^\beta} dw \geq \int |\hat{\psi}_{k+1}^z(w)|^2 e^{-2\alpha z|w|^\beta} dw.$$

It can now be shown that all of the output singular functions, $\phi_k^z(t)$, where $k\geq 1$ decay at a rate which is substantially faster than the first singular function $\phi_0^z(t)$.

Theorem 6. Let $L_z^l$ be the operator defined in equation (12). Let $\psi_1^z(t)$ be the second input singular function of this compact operator. The decay of the singular value associated with this vector is $$\|L_z^l(\psi_1^z)\| = \sigma_1^z = O(z^{-3/2\beta}),$$

Proof Begin with the partition of unity, $$\frac{2\pi}{l}\sum_{k=0}^{\infty}|\hat{\psi}_k^z(w)|^2 = 1,$$

which implies that $$\frac{2\pi}{l}\sum_{k=1}^{\infty}|\hat{\psi}_k^z(w)|^2 = 1 - \frac{2\pi}{l}|\hat{\psi}_0^z(w)|^2,$$

and more specifically $$\frac{2\pi}{l}|\hat{\psi}_k^z(w)|^2 \leq 1 - \frac{2\pi}{l}|\hat{\psi}_0^z(w)|^2, \tag{13}$$

whenever $k\geq 1$. Now consider the function $$\chi_{[0,l]}(t) = \begin{cases} 1 & \text{for } t\in[0,l] \\ 0 & \text{for } t\notin[0,l] \end{cases}$$

The absolute value of its Fourier transform is a constant multiple of $$\frac{\sin(lw/2)}{(lw/2)}.$$

Next consider the normalized function $p_0(t)=1/\sqrt{l}\chi_{[0,l]}(t)$ as the lead function from the orthonormal Legendre polynomials. If this orthonormal set $p_k(t)$ is considered, there is a natural partition of unity $$\frac{2\pi}{l}\sum_{k=0}^{\infty}|\hat{p}_k(w)|^2 = 1.$$

In addition all of the Legendre polynomials for $k\geq 1$ have average value zero, or that $\hat{p}_k(0)=0$ for $k\geq 1$. Thus $$\frac{2\pi}{l}|\hat{p}_0(0)|^2 = 1,$$

which allows the normalizing constant for the Fourier transform to be determined as $$\frac{2\pi}{l}|\hat{p}_0(w)|^2 = \left|\frac{\sin((lw)/2)}{(lw/2)}\right|^2. \tag{14}$$

Now, returning to equation (13) and integrating both sides with respect to the squared value of the Fourier kernel, $$\int \frac{2\pi}{l}|\hat{\psi}_k^z(w)|^2 e^{-2\alpha z|w|^\beta} dw \leq \int \left(1 - \frac{2\pi}{l}|\hat{\psi}_0^z(s)|^2\right) e^{-2\alpha z|w|^\beta} dw = \tag{15}$$
$$\int e^{-2\alpha z|w|^\beta} dw - \int \frac{2\pi}{l}|\hat{\psi}_0^z(w)|^2 e^{-2\alpha|z|^\beta w} dw.$$

The dominant singular vector $v_0^z$ is the function with norm 1 which maximizes the energy of the operator, giving $$\int \frac{2\pi}{l}|\hat{\psi}_0^z(w)|^2 e^{-2\alpha z|w|^\beta} dw \geq \int \frac{2\pi}{l}|\hat{p}_0(w)|^2 e^{-2\alpha|z|^\beta w} dw =$$
$$\int \left|\frac{\sin((lw)/2)}{(lw/2)}\right|^2 e^{-2\alpha z|w|^\beta} dw,$$

from equation (14). Returning to equation (15), for any $k\geq 1$ $$\int \frac{2\pi}{l}|\hat{\psi}_k^z(s)|^2 e^{-2\alpha z|w|^\beta} dw \tag{16}$$
$$\leq \int e^{-2\alpha z|w|^\beta} dw - \int \frac{2\pi}{l}|\hat{\psi}_0^z(s)|^2 e^{-2\alpha z|w|^\beta} dw,$$
$$\leq \int e^{-2\alpha z|w|^\beta} dw - \int \left|\frac{\sin((lw)/2)}{(lw/2)}\right|^2 e^{-2\alpha z|w|^\beta} dw,$$
$$= \int \left(1 - \left|\frac{\sin((lw)/2)}{(lw/2)}\right|^2\right) e^{-2\alpha z|w|^\beta} dw.$$

Now returning to the basics, $\sin(w)/w = 1-w^2/3!O(w^4)$, or, $(\sin(w)/w)^2 = (1-w^2/3+O(w^4))^2 = 1-2w^2/3!+O(w^4) = w^2/3+O(w^4)$. Thus it follows that $1-(\sin(w)/w)^2 = w^2/3+O(w^4)$. Utilizing this in equation (16) gives $$\int \frac{2\pi}{l}|\hat{\psi}_k^z(w)|^2 e^{-2\alpha z|w|^\beta} dw \tag{17}$$
$$\leq \int \left(1 - \left|\frac{\sin((lw)/2)}{(lw/2)}\right|^2\right) e^{-2\alpha z|w|^\beta} dw$$

-continued $$= \int \frac{1}{3}\frac{(lw)^2}{4}e^{-2az|w|^\beta}dw + \int (O(w^4))e^{-2az|w|^\beta}dw$$

$$= \int_0^\infty \frac{(lw)^2}{6}e^{-2az|w|^\beta}dw + \int (O(w^4))e^{-2az|w|^\beta}dw$$

Using the change of variable $u^\beta=zw^\beta$, and $du=z^{1/\beta}dw$ then $$\int \frac{2\pi}{l}|\hat{\psi}_k^z(s)|^2 e^{-2az|w|^\beta}dw \quad (18)$$

$$\leq \frac{l^2}{6}\int_0^\infty w^2 e^{-2az|w|^\beta}dw + \int (O(w^4))e^{-2az|w|^\beta}dw$$

$$= \frac{2l^2}{12}\int_0^\infty \left(\frac{u}{z^{1/\beta}}\right)^2 e^{-2au}\frac{du}{z^{1/\beta}} + \int O\left(\frac{u}{z^{1/\beta}}\right)^4 e^{-2au}\frac{du}{z^{1/\beta}}$$

$$= O(z^{-3/\beta}) + O(z^{-5/\beta}) = O(z^{-3/\beta}).$$

Thus the squared energy of all subsequent singular functions, or the singular values for $k \geq 1$ decay at a rate of at least $O(z^{-3/\beta})$, or the energy of the second singular value $L_z(\psi_1^z) = \sigma_1^z = O(z^{-3/2\beta})$.

General Theorem. It is possible to continue in this manner, getting bounds for each of the singular values. With this in mind, it is possible to state and prove a general theorem. First, by the optimal energy property of the singular value decomposition $$\sum_{k=0}^N \|L_z(\psi_k^z(t))\|_2^2 \geq \sum_{k=0}^N \|L(p_k(t))\|^2,$$

where $p_k(t)$ is any orthonormal basis, or can more specifically be the Legendre polynomials. Second, from the partition of unity $$\frac{2\pi}{l}|\hat{\psi}_k^z(w)|^2 \leq 1 - \sum_{j=0}^{k-1}|\hat{\psi}_k^z(w)|^2.$$

This allows bounding the energy in the functions $K(\psi_k^z(t))$.

Theorem 7. Let $L_z$ be the operator defined in equation (12). Let $\psi_k^z(t)$ be the $k^{th}$ singular function defined of this compact operator. The decay of the singular value associated with this vector $$\|L(\psi_k^z)\| = \sigma_k^z = O(z^{-(2k+1)/2\beta}).$$

First, consider the following Lemma.

Lemma 8. Let $p_j(t)$ be the $j^{th}$ order orthonormal Legendre polynomials on an arbitrary interval $[a,b]$. Then $$1 - \frac{2\pi}{l}\sum_{j=0}^{k-1}|\hat{p}_j(w)|^2 = O(w^{2k}).$$

Lemma Proof. Remember that the Legendre polynomials can be created by using the Gramm-Schmidt process on the monomials. One of their most important properties is that the $k^{th}$ order polynomial is orthogonal to all lower order polynomials, or monomials $t^j$, where $j<k$. This implies that the $j^{th}$ moment $$\frac{1}{\sqrt{2\pi}}\int t^j p_k(t) = \hat{p}_k^{(j)}(0) = 0$$

whenever $j<k$, or that the $j^{th}$ derivative of $\hat{p}_k(w)$, $\hat{P}_j^{(k)}(0)=0$ if $j<k$. Thus, $\hat{p}_k(w)$ has k zeros at the origin, which implies that $|\hat{p}_k(w)|^2$ has 2k zeros at the origin. Knowing that $$1 - \frac{2\pi}{l}\sum_{j=0}^{k-1}|\hat{p}_k(w)|^2 = \frac{2\pi}{l}\sum_{j=k}^\infty |\hat{p}_j(w)|^2.$$

The function on the right must have 2k zeros at the origin, or in other words, its first $2k-1$ derivatives must be zero. Therefore, the Taylor expansion of $$1 - \frac{2\pi}{l}\sum_{j=0}^k |\hat{p}_j(w)|^2 = O(w^{2k}).$$

Theorem Proof. Returning to the theorem proof, there is $$\frac{2\pi}{l}|\hat{\psi}_k^z(w)|^2 \leq 1 - \sum_{j=0}^{k-1}|\hat{\psi}_k^z(w)|^2.$$

Integrating with respect to the squared Fourier kernel and using the Fourier isometry gives $$\frac{2\pi}{l}\|L_z(\psi_k(t))\|^2 =$$

$$\int \frac{2\pi}{l}|\hat{\psi}_k^z(w)|^2 e^{-2az|w|^\beta}dw \leq \int \left(1 - \sum_{j=0}^{k-1}|\hat{\psi}_j^z(w)|^2\right)e^{-2az|w|^\beta}dw.$$

Utilizing the optimality of the singular functions gives $$\frac{2\pi}{l}\|L_z(\psi_k(t))\|^2 \leq \int \left(1 - \sum_{j=0}^{k-1}|\hat{\psi}_j^z(w)|^2\right)e^{-2az|w|^\beta} \leq$$

$$\int \left(1 - \sum_{j=0}^{k-1}|\hat{p}(w)|^2\right)e^{-2az|w|^\beta}dw.$$

Lemma 8 gives $$\frac{2\pi}{l}\|L_z(\psi_k(t))\|^2 \leq \int \left(1 - \sum_{j=0}^{k-1}|\hat{p}(w)|^2\right)e^{-2az|w|^\beta}dw = \int_0^\infty O(w^{2k})e^{-2azw^\beta}dw.$$

Doing the change of variable $u^\beta=zw^\beta$, or $u=z^{1/\beta}w$ and $du=z^{1/\beta}dw$ yields $$\frac{2\pi}{l}\|L_z(\psi_k(t))\|^2 \leq \int O(w^{2k})e^{-2\alpha z|w|^\beta}dw \quad (19)$$

$$= \frac{1}{z^{1/\beta}}\int O\left(\frac{u^{2k}}{z^{2k/\beta}}\right)e^{-2\alpha u^\beta}du$$

$$= O(z^{-(2k+1)/\beta})\int u^{2k}e^{-2\alpha u^\beta}du$$

$$= O(z^{-(2k+1)/\beta})\int u^{2k}e^{-2\alpha u^\beta}du = O(z^{-(2k+1)/\beta}).$$

Thus the squared energy $\|L_z(\psi_k(t))\|^2=O(z^{-(2k+1)/\beta})$ and taking a square root provides the asymptotics for the singular value $\sigma_k=\|L_z(\psi_k(t))\|=O(z^{-(2k+1)/2\beta})$.

It has been proved that energy of the singular functions $v_k(t)=L_z(\psi_z^k(t))$ decays at a rate of $O(z^{-(2k+1)/2\beta})$, it has not been proven that they only decay at that rate, and no faster. Namely, it is desirable to show that $L_z(\psi_k^z(t))\neq o(z^{-(2k+1)/2\beta})$. In addition, it can be shown that $\psi_k^z(t)\to p_k(t)$ where the function $p_k(t)$ are the Legendre polynomials. The following Lemma is used to make this proof clear.

Lemma 9. Let $p_k(t)$ be the $k^{th}$ order orthonormal Legendre polynomial on an arbitrary interval [0,1]. Then the decay rate of $p_k(t)$ through a distance z of a medium with an absorption coefficient $\alpha(w)$ which satisfies $\alpha(\omega)=\omega^{-\beta}$ as $\omega\to 0$ is $$L_z(p_k(t))=O(z^{-(2k+1)/2\beta}).$$

In addition, $$L_z(p_k(t))\neq o(z^{-(2k+1)/2\beta}).$$

Proof Begin with the basic properties of the Legendre polynomials.

They are obtained by orthogonalizing the monomials, i.e. 1, t, $t^2$, $t^3$ . . . . As a result each Legendre polynomial is orthogonal to the lower order monomials in the sense that $\int p_k(t)t^j=0$ for all $j<k$. By the Fourier isometry this is equivalent to the moment condition $\hat{p}_k^{(j)}(\omega)=0$ if $j<k$, where $\hat{p}_k^{(j)}$ is the $j^{th}$ derivative of $\hat{p}_k(\omega)$. Moreover $p_k(t)$ is definitely not orthogonal to $t^k$ so $\hat{p}_k^{(k)}\neq 0$. As previously formulated, the energy of $$\|L_z(p_k(t))\|^2=\int|\hat{p}_k(w)|^2 e^{-2\alpha z|w|^\beta}dw \quad (20)$$

Because of the moments of $p_k(t)$, the Taylor expansion of $\hat{p}(\omega)$ is given by $$\hat{p}(w)=\sum_{j=k}^{\infty}\hat{p}^{(j)}(w)\frac{w^j}{j!}.$$

Inserting this into equation (20), yields $$\|L_z(p_k(t))\|^2 = \int|\hat{p}_k(w)|^2 e^{-2\alpha z|w|^\beta}dw \quad (21)$$

$$= \int\left|\sum_{j=k}^{\infty}\frac{\hat{p}^{(j)}(0)}{j!}w^j\right|^2 e^{-2\alpha z|w|^\beta}dw$$

-continued $$= \int\left|\hat{p}_k^{(k)}(0)\frac{w^k}{k!}+O(w^{(k+1)})\right|^2 e^{-2\alpha z|w|^\beta}dw$$

$$= |\hat{p}_k^{(k)}(0)|^2 2\int_0^\infty \frac{w^{2k}}{(k!)^2}e^{-2\alpha z|w|^\beta}dw + \int_0^\infty O(w^{2k+2})e^{-2\alpha z|w|^\beta}dw$$

Using the change of variable $u^\beta=zw^\beta$, or $u=z^{1/\beta}w$ and $du=z^{1/\beta}dw$ yields $$\|L_z(p_k(t))\|^2 = \int|\hat{p}_k(w)|^2 e^{-2\alpha z|w|^\beta}dw \quad (22)$$

$$= \frac{2|\hat{p}_k^{(k)}(0)|^2}{(k!)^2}\int_0^\infty w^{2k}e^{-2\alpha z|w|^\beta}dw + \int_0^\infty O(w^{2k+2})e^{-2\alpha z|w|^\beta}dw$$

$$= 2|\hat{p}_k^{(k)}(0)|^2\frac{1}{z^{1/\beta}}\int_0^\infty\left(\frac{u^{2k}}{z^{2k/\beta}}\right)e^{-2\alpha u^\beta}du + \frac{1}{z^{1/\beta}}\int_0^\infty O\left(\left(\frac{u^{2k+2}}{z^{(2k+2)/\beta}}\right)\right)e^{-2\alpha u^\beta}du$$

$$= |\hat{p}_k^{(k)}(0)|^2 2\frac{1}{z^{1/\beta}}\int_0^\infty\left(\frac{u^{2k}}{z^{2k/\beta}}\right)e^{-2\alpha uz}du + \frac{1}{z^{1/\beta}}\int_0^\infty\left(\frac{u^{2k+2}}{z^{(2k+2)/\beta}}\right)e^{-2\alpha u^\beta}du$$

$$= O(z^{-(2k+1)/\beta}) + O(z^{-(2k+3)/\beta}) = O(z^{-(2k+1)/\beta}).$$

Thus taking the square root gives $$\|L_z(p_k(t))\|^2=O(z^{-(2k+1)/2\beta}).$$

Now since $p_k^{(k)}(0)\neq 0$ it follows that $$\|L_z(p_k(t))\|^2\neq o(z^{-(2k+1)/2\beta}).$$

Thus this rate of decay is exact.

Now consider another theorem of this disclosure.

Theorem 10. Let $\psi_k^z(t)$ be the $k^{th}$ singular vector for the operator $L_z$ and $p_k(t)$ be the $k^{th}$ Legendre polynomial on [0,1], then $$\lim_{x\to\infty}\|\psi_k^z(t)-p_k(t)\|=0..$$

Proof. Proceeding by induction, begin with the case k=0. It is known that if $p_0(t)$ is the orthonormal first, or constant function of a Legendre series, then $$\frac{2\pi}{l}|\hat{p}_k(0)|^2=1.$$

Any confusion about this can be ended by realizing that $p_0(t)$ is also the first function of a standard exponential Fourier series, and therefore $\hat{p}_k(w)$ is an element of the classical Shannon series, which obtains its maximum value at the origin. Therefore all other functions in the standard Shannon series are zero at the origin, so $\hat{p}_0(0)$ must attain the bound or equation (9) by itself. Furthermore, $\hat{p}(w)$ and $\hat{u}_0^z(w)$ are both entire functions and therefore continuous. By the optimal energy property of the singular value decomposition $$\lim_{z\to\infty}\int|\hat{p}_0(w)|^2 e^{-2\alpha z|w|^\beta}dw \leq \lim_{z\to\infty}\int|\hat{\psi}_0^z(w)|^2 e^{-2\alpha z|w|^\beta}dw..$$

Since $e^{-2\alpha z|w|^\beta}$ will become absolutely concentrated about w=0 as $z\to\infty$, it follows that $|\hat{p}_0(0)|\leq\lim_{z\to\infty}|\hat{\psi}_0^z(0)|$ and therefore $1=(2\pi/l)\hat{p}_0(0)\leq(2\pi/l)\hat{\psi}_0^z(0)$. Remember that $p_0(t)$ is not only the first function of a Legendre series on [0,1], it is also the first function of and exponential series on [0,1]. Therefore by the properties of a Shannon series, the only unitary function which can obtain a maximum value at zero is $\hat{p}_0(w)$, and thus $\hat{p}_0(0) \geq \hat{\psi}_0^z(0)$ which implies that $\lim_{z \to \infty} \hat{\psi}_0^z(0) = \hat{p}(0)$. There is only one function on [0,1] which will attain this and therefore $\lim_{z \to \infty} \hat{\psi}_0^z(w)$, or equivalently $\lim_{z \to \infty} \hat{\psi}_0^z(t)$. Now inducing the induction hypothesis, and assuming that this is true for an arbitrary k, all of the singular functions $\hat{\psi}_j^z(t) \to p_j(t)$ for $j \leq k$. The $(k+1)^{st}$ singular vector in terms of the Legendre polynomials can be expanded to $$\psi_{k+1}^z(t) = \sum_{j=0}^{\infty} c_j(z) p_j(t).$$

By the induction hypothesis, for $j \leq k$ all of the coefficients $c_j(z) \to 0$. By the definition of the singular value decomposition the function $\psi_{k+1}^z(t)$ will carry the maximum energy outside of the orthogonal complement of the earlier singular functions. It has been proven in Lemma 9 that each of the Legendre polynomials carries less energy as $z \to \infty$. The $(k+1)^{st}$ singular vector cannot have any energy left on the Legendre polynomials of lower order, since the lower singular vectors will converge identically to the lower order Legendre polynomials. Therefore $u_{k+1}^z(t)$ will have to concentrate its energy on the set $\{p_j(t)\}j=k+1^{\infty}$. Lemma 9 shows that the lowest of these polynomials carries the most energy and therefore $\psi_{k+1}^z(t) \to p_{k+1}(t)$.

Amplitude and Dispersion. Absorption and dispersion are interconnected by the Kramers-Kronig relations. The nature of the singular value decomposition is that it does care about dispersion. The singular value decomposition only considers power, and as a result dispersion is somewhat discarded. It has been shown that the Legendre polynomials are asymptotic singular vectors for transmission through absorbing media. This means that these functions maximize the amount of power which is transmitted through the medium. It is entirely appropriate, however, to question whether this power is dispersed to the point where it will be difficult to recover. Brillouin and Sommerfeld showed that the amplitude of the Brillouin and Sommerfeld precursors decayed at a rate of $z^{-1/2}$. Thus there is significant energy and power at this specific time.

It is natural to ask whether the Legendre polynomials yield a similar benefit, and have the same properties, or are they massively dispersed so that it will be difficult for a physical system to recover the power which was transmitted through the system. To answer this question consider the classical Lorentz case, where $\beta = 2$, and utilize the transfer kernel which J. R. Klauder presented in "Signal transmission in passive media" (IEE Proc. Radar Sonar Navig., Vol. 152, No. 1, February 2003), which is hereby incorporated by reference in its entirety. From a Lorentz model, Klauder showed that the asymptotic nature of an original pulse $f_0(t)$, which is transmitted through a medium of length z is given by $$f_z(t) = \sqrt{\frac{a}{2\pi z}} \int e^{-as^2/2z} f_0(s + t - v^{-1}z) ds, \quad (23)$$

where $v$ is the velocity of propagation. Letting $t' = t - v^{-1}z$, equation (23) can be written as a standard convolution or correlation equation $$f_z(t') = \sqrt{\frac{a}{2\pi z}} \int e^{-as^2/2z} f_0(s + t') ds \quad (24)$$

$$= \sqrt{\frac{a}{2\pi z}} \int f_0(x) e^{-a(x-t')^2/2z} dx \quad (25)$$

Now consider the propagation of the Legendre polynomials through this system.

Let $p_k(t)$ be the $k^{th}$ orthonormal Legendre polynomial. Next consider $$f_z^k(t') = \sqrt{\frac{a}{2\pi z}} \int p_k(x) e^{-a(x-t')^2/2z} dx. \quad (26)$$

Expanding the exponential kernel gives $$f_k^z(t') = \sqrt{\frac{a}{2\pi z}} \int p_k(x) \sum_{m=0}^{\infty} \frac{(-a(x-t')^2)^m}{(2z)^m m!} dx$$

$$= \sqrt{\frac{a}{2\pi z}} \int p_k(x) \sum_{m=0}^{\infty} \frac{-a^m (x-t')^{2m}}{(2z)^m m!} dx.$$

Beginning with $p_1(x)$, which is orthogonal to the constant function, then $$f_z^1(t') = \sqrt{\frac{a}{2\pi z}} \int p_1(x) \sum_{m=0}^{\infty} \frac{-a^m (x-t')^{2m}}{(2z)^m m!} \quad (27)$$

$$= \sqrt{\frac{a}{2\pi z}} \int p_1(x) \left(1 - \frac{a(x-t')^2}{2z} + \sum_{m=2}^{\infty} \frac{-a^m (x-t')^{2m}}{(2z)^m m!}\right) dx$$

$$= \sqrt{\frac{a}{2\pi z}} \int p_1(x) \frac{a(x-t')^2}{2z} + p_1(x) \sum_{m=2}^{\infty} \frac{-a^m (x-t')^{2m}}{(2z)^m m!} dx$$

$$= \sqrt{\frac{a}{2\pi z}} \left(\int p_1(x) \frac{a(x-t')^2}{2z} dx + O(z^{-2})\right)$$

$$= \frac{1}{z^{3/2}} \sqrt{\frac{a}{2\pi}} \int p_1(x)(ax^2 - 2axt' + at'^2) dx + O(z^{-5/2})$$

$$= \frac{1}{z^{3/2}} \sqrt{a} (a\hat{p}_1^2(0) - 2at' \hat{p}_1^1(0) + 0) + O(z^{-5/2}).$$

There are a number of things to observe from equation (27). It is a polynomial, and therefore cannot be zero except at a few points. While one might make the mistake of assuming that the shape of the resultant pulse is linear, remember that this is a local approximation. The important point is that the approximation decays at the rate $O(z^{-3/2})$ and everything else is independent of z.

Next consider $p_2(x)$. The same formulation gives $$f_z^2(t') = \sqrt{\frac{a}{2\pi z}} \int p_2(x) \sum_{m=0}^{\infty} \frac{-a^m (x-t')^{2m}}{(2z)^m m!} \quad (28)$$

$$= \frac{1}{z^{3/2}} \sqrt{\frac{a}{2\pi}} \int p_2(x)(ax^2 - 2axt' + at'^2) dx + O(z^{-5/2})$$

-continued $$= \frac{1}{z^{3/2}} \sqrt{a} \left( a\hat{p}_2^2(0) - 2at'\hat{p}_2^1(0) + 0 \right) + O(z^{-5/2})$$

$$= \frac{1}{z^{3/2}} \sqrt{a} \left( a\hat{p}_2^2(0) - 0 + 0 \right) + O(z^{-5/2}),$$

where the first moment of $p_2$ is also zero. Thus the decay rate does not go down for $p_2(x)$ even though the energy decays at a faster rate. It had expected that the amplitude of $p_2$ would decay as $z^{-5/2}$, but rather it is the same as that of $p_1$. This will continue with the odd and even Legendre polynomials. The theorem can be stated as Theorem 11. If $\beta=2$ the Legendre polynomials will decay in maximum amplitude as $z^{-1/2}$ for $p_0$, $z^{-3/2}$ for $p_1$ and $p_2$, $z^{-5/2}$ for $p_3$ and $p_4$, and $z^{-(1+q)/2}$ for $p_k$ where q is the lower integer bound on (k+1)/2.

Proof. The proof is identical to the argument above. Note that the lower polynomials terms in the expansion are annihilated by the Legendre polynomials, and the leading non-zero term will be a polynomial which by definition cannot be zero in any region. The additional $z^{-q}$ terms come from the expansion.

Numerical Adaptation. It has been shown that the Legendre polynomials are asymptotically the basis for transmission through absorbing and dispersive media. A finite time limit has been inserted to the inputs to the operator, and as a result the kernel can be altered from $A_z(\tau-t)$ to $K_z(t,\tau)$, where $\chi_I(\tau)=1$ for $\tau \in [0,1]$ without changing the output signals. This results in $K_z(t,\tau)$ being square integrable for all $(t,\tau)$. A discrete approximation (matrix) to this kernel can be formed by first choosing a minimum value or tolerance below which the function won't be computed, and secondly sampling. The first step is to truncate the kernel to $$K_z^{tol}(t,\tau) = \begin{cases} K_z(t,\tau) & \text{if } K_z(t,\tau) > tol \\ 0 & \text{if } K_z(t,\tau) < tol \end{cases}$$

Figure 2:
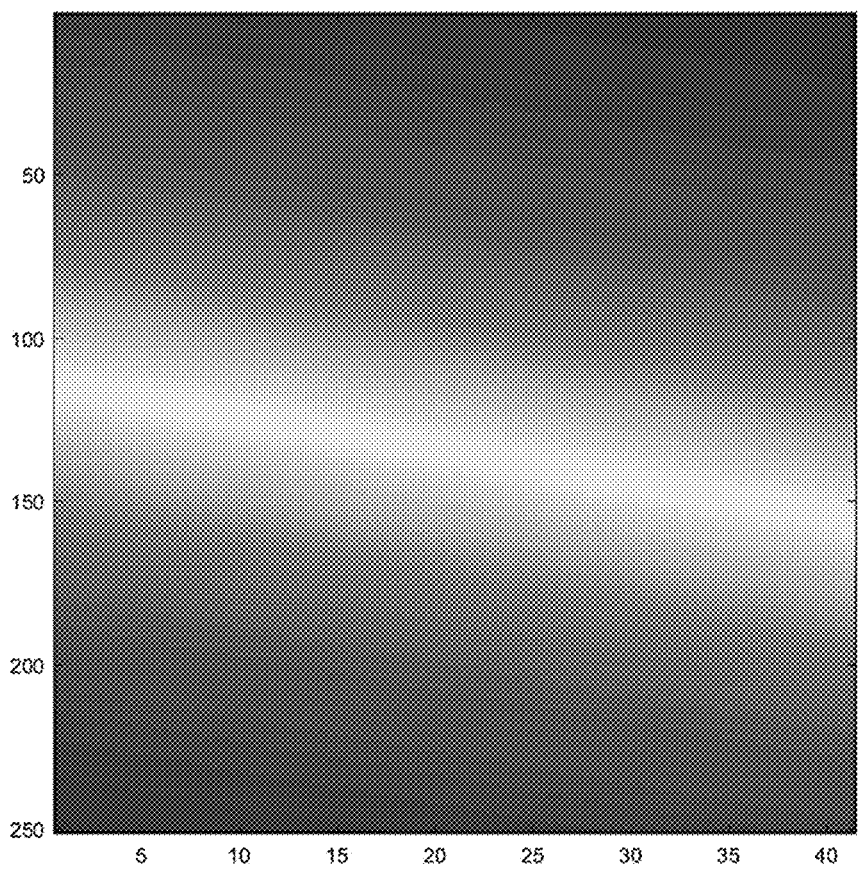
FIG. 2 illustrates an example of a truncated Teoplitz form, in accordance with various embodiments of the present disclosure.

The operator $K_z^{tol}(t,\tau)$ will now be a slice of an infinite Toeplitz form as illustrated in FIG. 2, which shows an example of a truncated Teoplitz form, such as is used to numerically model the results described above. Note that generally there will be far more rows than columns, such that in standard form it would be thin and long. The function $K_z^{tol}(t,\tau)$ can be sampled in both t and $\tau$ in order to form a simple matrix, from which the singular value decomposition can be extracted.

Dielectric and Pulse Models. Much of the fascination with precursors is due to the fact that they propagate with an absorption rate which is $z^{-1/2\beta}$ rather than $e^{-kz}$. Assume that the absorption operator coefficient is of the type $\alpha(w) = \alpha|w|^\beta$, so that the real part of the transfer function, in frequency, is of the form $$\text{Re}(\hat{A}_z(w)) = O(e^{-\alpha|w|^\beta})$$

In a region about the origin. Two different models will now be considered, and the convergence of the singular vectors, and singular values, are numerically checked, as well as their rate of convergence.

Chaplin Model. The first model is a typical Lorentz model, credited to M. Chaplin, which is a water model. Water is a highly variable substance when it comes to its dielectric behavior. The dielectric properties of water change with temperature, but the singular values and singular vectors will simply scale with the dielectrics. At the frequencies of interest, classic dispersion is negligible, so the concentration will be on the absorption, or loss, of the material. This is given by $$Lf = \frac{(\epsilon_s - \epsilon_\infty)\omega\tau}{1+\omega^2\tau^2},$$

where the $\epsilon_s$ is a temperature dependent factor, and $\epsilon_\infty$ reflect the dispersive behavior of water at high frequencies. The maximum absorption occurs at $1/\sqrt{\tau}$ which can be shown by basic calculus. This maximum absorption in water varies between 8 and 120 Ghz in water, depending on temperature. The singular values and vectors will adjust and scale regardless of the absolute units. This model decays as $O(\omega)$ as $\omega \to 0$.

Klauder Model. The second model we is derived from basic principles, credited J. R. Klauder. While similar, it assumes differentiability of the dielectric at 0, and therefore takes on the form $$Lf = \frac{1}{2a}\omega^2,$$

for small $\omega$.

These models have to adjust to temperature if modeling water. The structure of the singular values and vectors will adjust, and remain invariant regardless of the constants in the model, which are temperature dependent. Thus the models can be used to study the interaction of the singular values and vectors without having one absolute model for the dielectrics. FIG. 3A illustrates examples of absorption curves for water suggested by the Chaplin and Klauder models, from 0 to 3 Ghz. The first curve 303 is suggested by the Chaplin model with the temperature at 77 degrees Fahrenheit. This model is absolutely linear in this region, and attains its maximum at 120 Ghz. The second curve 306 is an altered version suggested by the Klauder model, which assumes that the model would be differentiable at the origin, which produces the $O(\omega^2)$ behavior at the origin. FIG. 3B illustrates the exponential transfer functions generated by the Chapman and Klauder models. The Klauder transfer function 309 is higher than the Chapman model 312, as is to be expected. In both cases, the generated transfer function through 10 centimeters of water is shown, at 77 degrees Fahrenheit.

Model of the Pulses. It is assumed that some type of short pulse is being propagated through the media. A 600 MHz pulse has been arbitrarily chosen for illustration. Experiments above and below this frequency yield similar results, so this pulse length has been fixed with the analysis concentrating on various singular vectors and singular values.

Decay of the Singular Values. The decay of the singular values will now be examined. The most fascinating result concerning the Brillouin precursor is that it decayed at only $O(1/\sqrt{z})$ as opposed to the expected $O(e^{-kz})$. The numerical results for the singular values will now be checked to see if they display precursor like behavior, and if they obey the predicted decay rates of Theorem 1.

The Chaplin Model decays at a rate $O(\omega)$ about the origin, so $\beta=1$ in Theorem 1. Thus, the singular values are expected to decay at a rate of $O(1/\sqrt{z})$, $O(1/z^{3/2})$, $O(1/z^{5/2})$, $O(1/z^{7/2})$, or $O(1/z^{(2k+1)/2})$. In FIGS. 4A-4B and 5A-5B, the first 4 of these singular vectors, and their inverse powers, are illustrated. FIG. 4A shows the decay rate of the first four singular vectors generated from the Chaplin model, as a function of z. FIG. 4B shows the decay rates of the first four singular vectors with the Klauder model. Note that they all appear to decay at a far from exponential rate. If the first singular vector is $\sigma_0^z=O(1/\sqrt{z})$, then $1/(\sigma_0^z)^2$ should be linear, as it appears in FIG. 4B. The Chaplin Model was similarly altered to conform to the assumptions of Klauder. With this model decaying at a rate $O(\omega)^2$) at the origin, with $\beta=2$ in Theorem 1, and therefore the decay is expected at a slightly slower rate of $O(1/z^{(2k+1)/2\beta})$, i.e. $\omega^{-1/4}$, $\omega^{-3/4}$, $\omega^{-5/4}$ . . . .

Figure 5A:
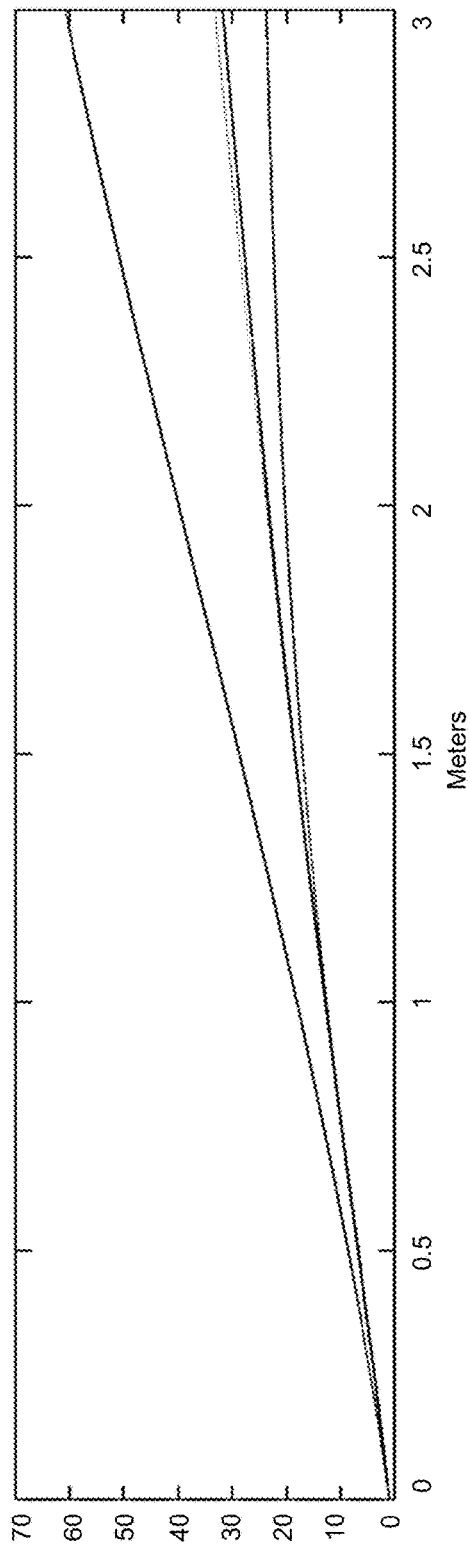
Figure 5B:
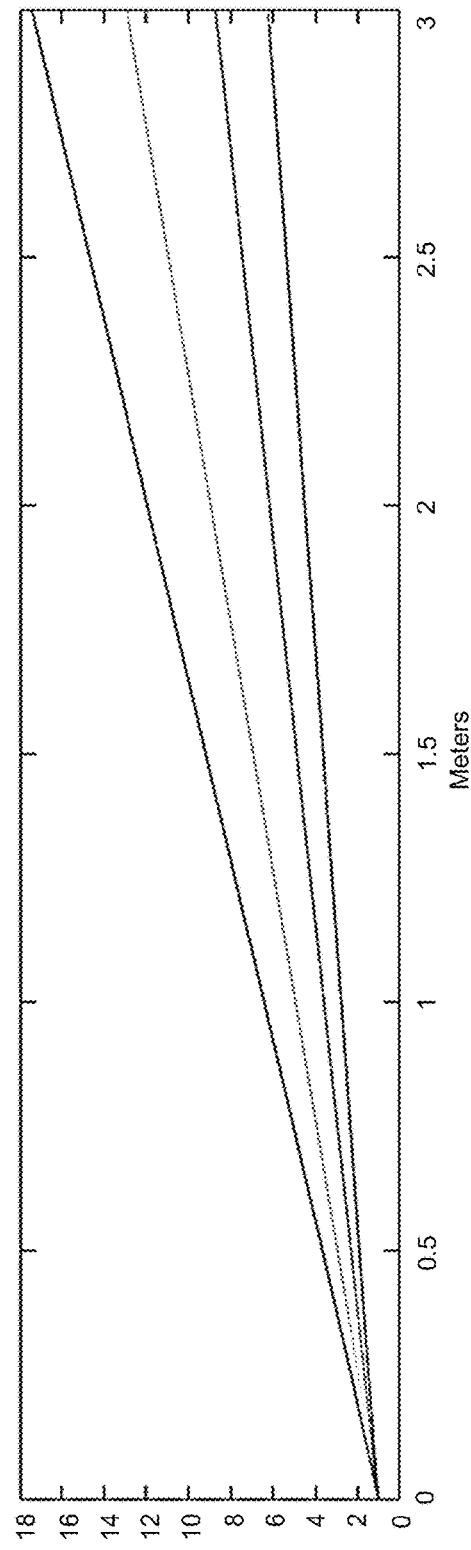

Similarly, the inverse powers of these singular vectors were compared, and these measurements support the conclusions of Theorem 1. FIG. 5A shows the inverse powers of the first four singular values of the Chapman model, as a function of z. Due to the fact that the Chapman model is $O(\omega)$ at the origin, the theory put forth above predicts that the graphs of $1/(\sigma_0^z)^2$, $1/(\sigma_1^z)^{2/3}$, $1/(\sigma_2^z)^{2/5}$, and $1/(\sigma_3^z)^{2/7}$ should be linear in the far field. Note that for larger z they all appear linear. Two of the graphs are so close to each other that they are indistinguishable. Similarly in FIG. 5B, the decay of first four singular values of the Klauder alteration to the Chapman Model is displayed. Since this alteration makes the model $O(\omega^2)$ the predicted theory says that the singular values should decay at a rate $O(1/\omega^{(2k+1)/4})$, so $1/(\sigma_k^z)^{4/(2k+1)}$ is displayed, which the theory suggests should be nearly linear. Once again they are very close to linear.

Figure 6A:
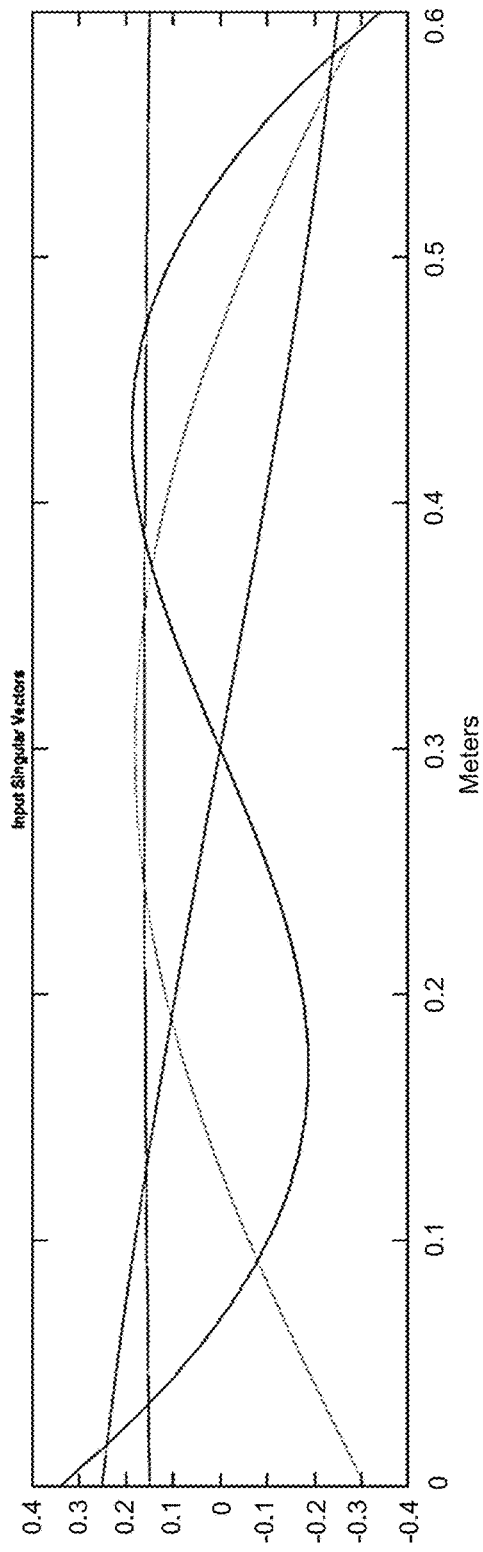
FIGS. 6A and 6B illustrate examples of input and output (or right and left) singular vectors, in accordance with various embodiments of the present disclosure.
Figure 6B:
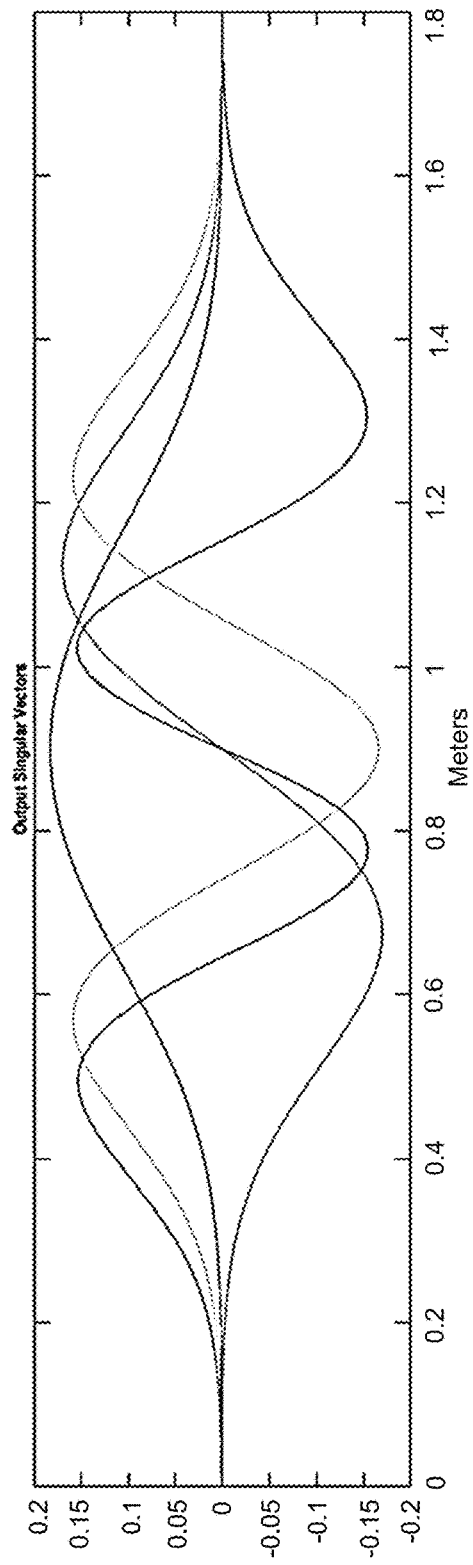

Convergence of the Singular Vectors. The claim in Theorem 1 that the right, or input singular vectors of the operators $L_z(f)$ converge to the Legendre polynomials as $z\to\infty$ will now investigated. This result can be quite significant if the convergence is fast, and nearly useless, if the convergence is very slow. Thus the truncated and sampled versions of these operators are examined to see exactly what the singular vectors are, at a reasonable transmission distance. FIGS. 6A and 6B illustrate both the input and output singular vectors. The first 4 left and right singular vectors at a distance z=2 meters are shown. The right, or input singular vectors are shown in FIG. 6A and the left, or output singular vectors are shown in FIG. 6B. The right singular vectors are essentially identical to the Legendre polynomials.

Figure 7:
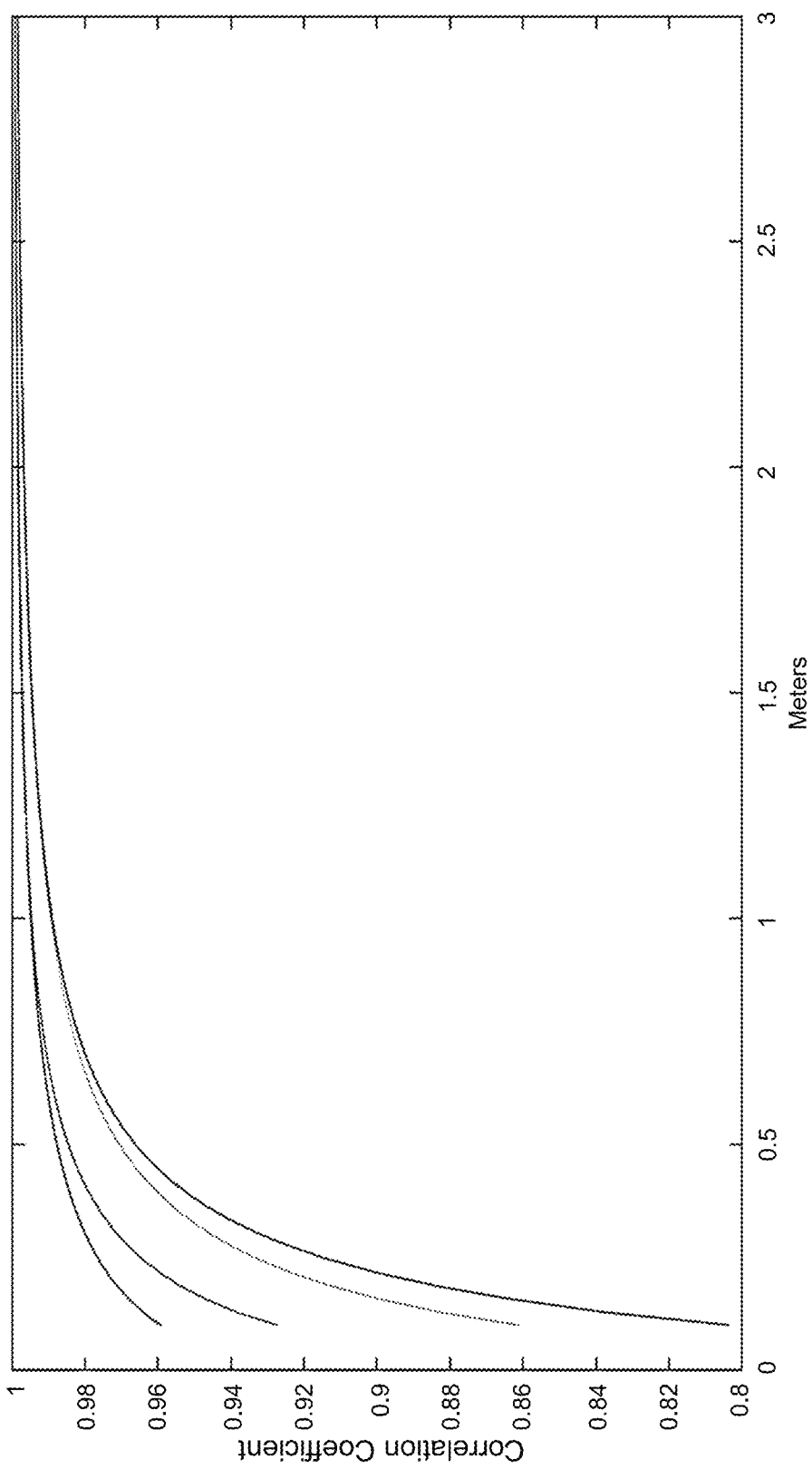
FIG. 7 illustrates an example of correlations between input singular vectors and the Legendre polynomials, in accordance with various embodiments of the present disclosure.

While a trained eye might note that the singular vectors shown in FIGS. 6A and 6B are nearly the Legendre polynomials, it is informative to check and see how close these functions are to the Legendre polynomials with a bit more formal analysis. FIG. 7 illustrates the correlations between these input singular vectors and the Legendre polynomials by graphing the correlation coefficient of each against the corresponding Legendre polynomial at a given distance z. The correlation coefficient means the cosine of the angles between them, or $$\cos(\theta) = \frac{\vec{a}\cdot\vec{b}}{\|a\|\|b\|},$$

where $\vec{a}$ and $\vec{b}$ are the respective functions or vectors. If the vectors are nearly identical, or linearly dependent, then $\theta\approx0$ and thus the coefficients will be nearly 0. FIG. 7 shows the correlation between the first 4 singular vectors of $L_z(f)$ and the Legendre polynomials at a distance z. From FIG. 7 it can be seen that the convergence is quite rapid, with all coefficients heading to 1. A correlation of 1 means they are identical. Notice that they are all nearly identical at a distance z=3 meters. From this it can be concluded that a good approximate singular value decomposition can be had by using the Legendre polynomials for the input vectors.

A Theorem and strong numerical evidence exist as to what the input singular vectors look like, and it would desirable to describe the output singular vectors in closed form as well. That doesn't seem to be possible. They are quite simply the convolution of the input singular vectors and the material dielectric kernel. Thus they are asymptotically the convolution of the Legendre polynomials and the dielectric kernel. First examination of them in FIG. 6B suggests that they are nearly a Sine series. The first singular vector looks much like a half-cycle sine wave. The second appears to be close to a complete Sine wave. The third has 3/2 of a cycle of a Sine wave, etc. and they are orthogonal. This would be a Sine series. They are infinitely supported in time, however, because of the infinite extent of the convolution kernel. This can be seen in the slow decay of the functions at the boundary. This may suggest a way to process them in a radar system, however.

Signal or Pulse Processing. These individual signals can be utilized to create a joint resolution which is far from that expected of the individual signals. This allows one to equalize the signal to noise ratio along the spectrum. This will also allow one to increase the resolution of the system beyond that which is expected from the dielectrics of the medium. Consider the following theorem, Theorem 12. Let $\{o_k(t)\}_k$ be any orthonormal basis for $L^2[a,b]$, and let $\{\hat{o}_k(w)\}_k$ be the respective Fourier transforms in $L^2(R)$. The quantity $$\sum_k |\hat{o}_k(w)|^2 \tag{29}$$

will be independent of w. Moreover a partition of unity exists, in the sense that $$\frac{2\pi}{b-a}\sum_k |\hat{o}_k(w)|^2 = 1.$$

Thus the Legendre polynomials which have been shown to be the singular values of the medium saturate the bandwidth completely. The entire bandwidth is thus being utilized, and can separated and manipulated as needed. The expansion of equation (4) will also be utilized. It is possible to transmit, but not all of the singular functions $\{u_k\}$ will be used with our system. Thus, look at a truncated expansion of the singular operator. This is represented by $$L_N(f)(t) = \sum_{k=0}^{N}\sigma_k\langle f, u_k\rangle v_k. \tag{30}$$

Equation (30) recognizes that it is not possible to transmit an infinite number of the singular functions, but rather the select few, e.g., the ones which carry the most energy. To achieve a well defined pulse response function through the medium, it would be desirable to have $$L_N(f(t))=\text{pr}(t).$$

That is generally not possible since only a finite number of functions can be used. Rather, to find the best possible approximation to the point response function, which is given by transmitting the pseudo inverse of pr(t), which is given by $$L^*_N(\text{pr}(t))=U_N\Sigma^{-1}V_N^t(\text{pr}(t)).$$

This can be rewritten in operator notation as $$L_N^*(pr(t)) = \sum_{k=0}^{N} \sigma_k^{-1} \langle v_k(t), pr(t) \rangle u_k(t). \quad (31)$$

The obvious problem with equation (31) is that $\sigma_k^{-1}$ might be very large, since the $\lim_{k \to \infty} \sigma_k \to 0$. This can be avoided by taking multiple samples of the image of $u_k(t)$ or $\sigma_k v_k(t)$. This will allows the signal to noise ratio to be equalized and get a stable inverse.

One example of a pseudo inverse has been demonstrated. There are many possible versions of pseudo inverses, which can allow the sharpening of the point spread function. The final choice of which one should be used depends on the specific application.

Figure 8:
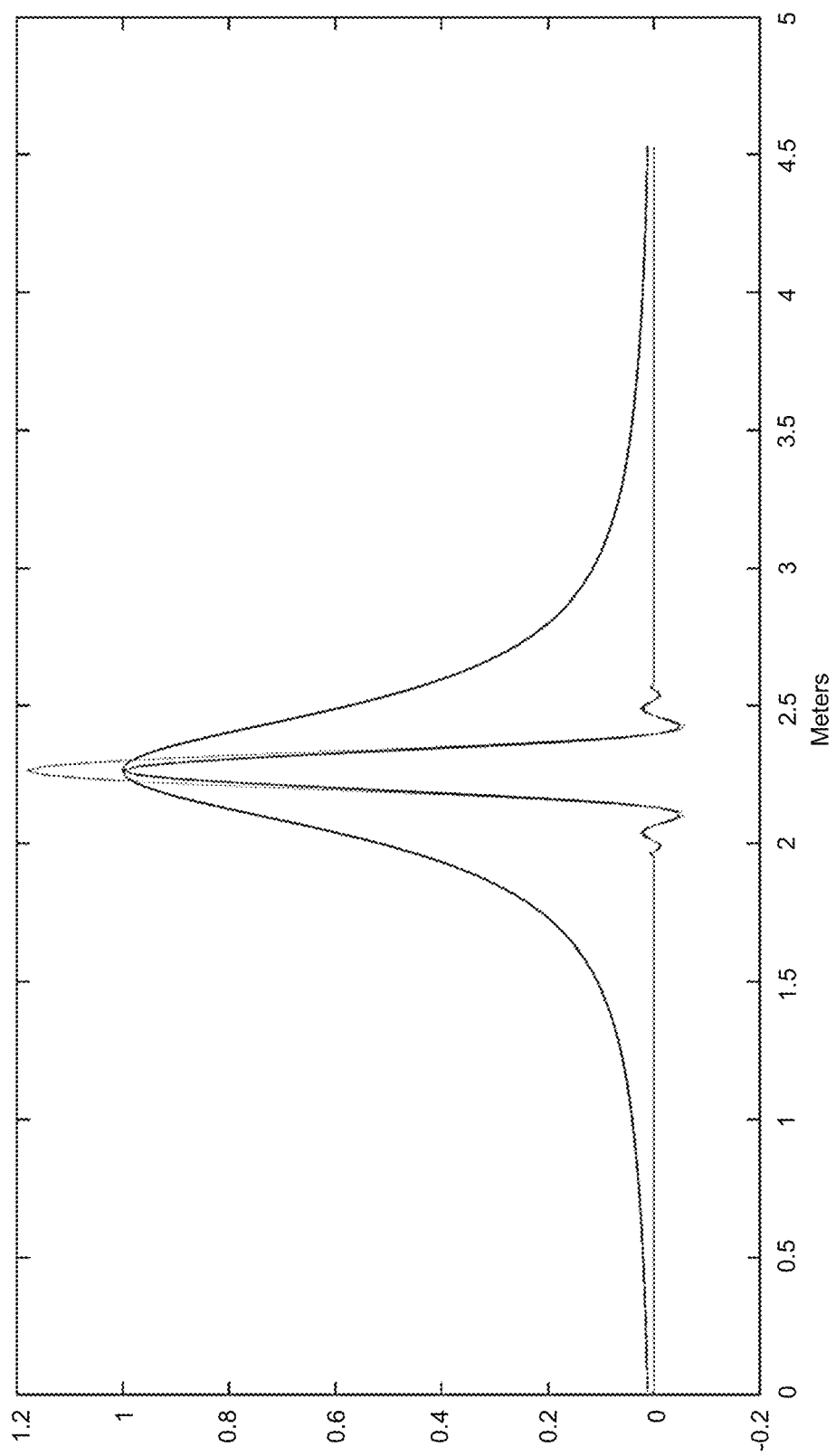
FIG. 8 illustrates an example of precursors to sharpen the pulse response function, in accordance with various embodiments of the present disclosure.

FIG. 8 illustrates how one can increase the resolution of the system substantially. It illustrates the use of multiple precursors to sharpen the pulse response function of the system. The first curve is the impulse (or point) response function of the system, which is equivalent to the first Brillouin precursor. The point response function of a point target through an absorbing media (water in this case) is shown. The other curves are the idealized point response function, and the point response function which is achieved by the use of an appropriate pseudoinverse. These curves represent the idolized inverse, or sharpened point spread function, and an approximate point spread function. The ability to exceed the temporal resolution of the simple Brillouin precursor is the basis and result of this research.

Figure 9:
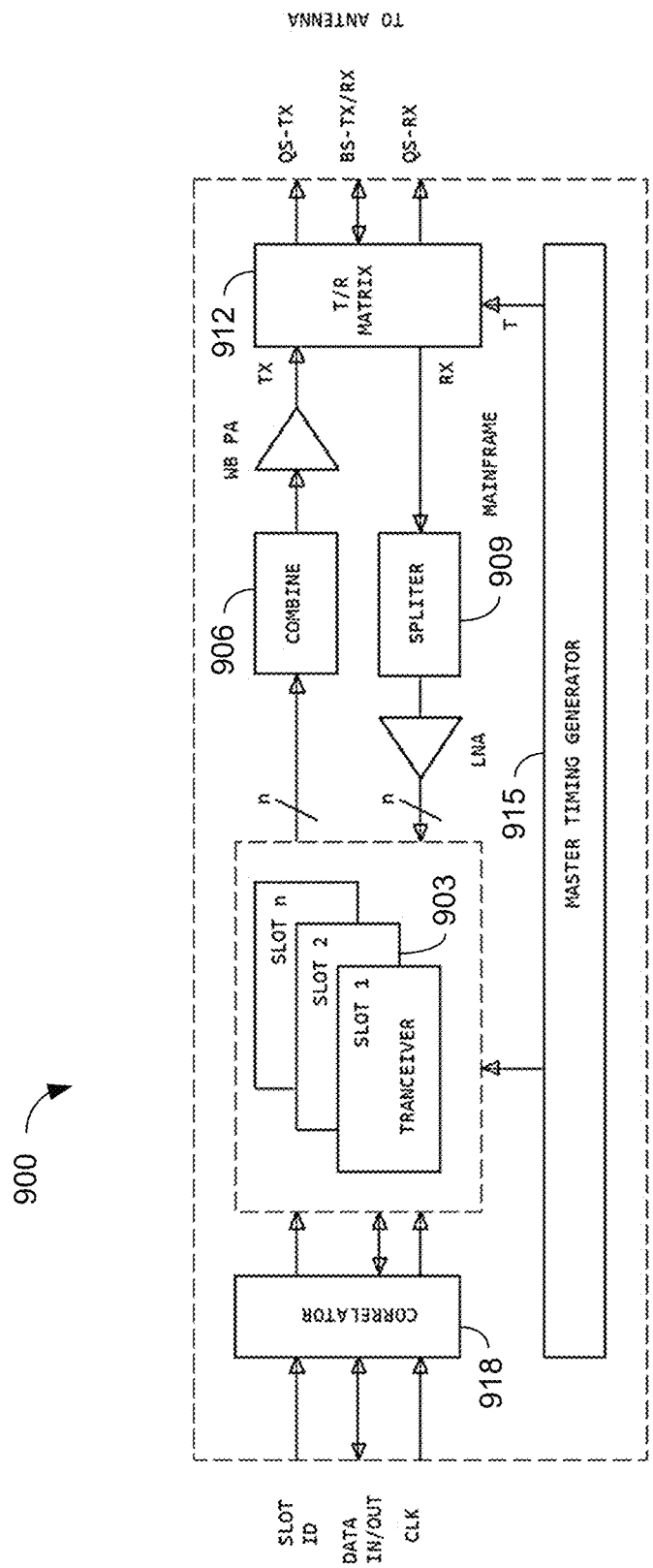
FIGS. 9 and 10 are schematic diagrams illustrating an example of a system for precursor based penetrating radar, in accordance with various embodiments of the present disclosure.
Figure 10:
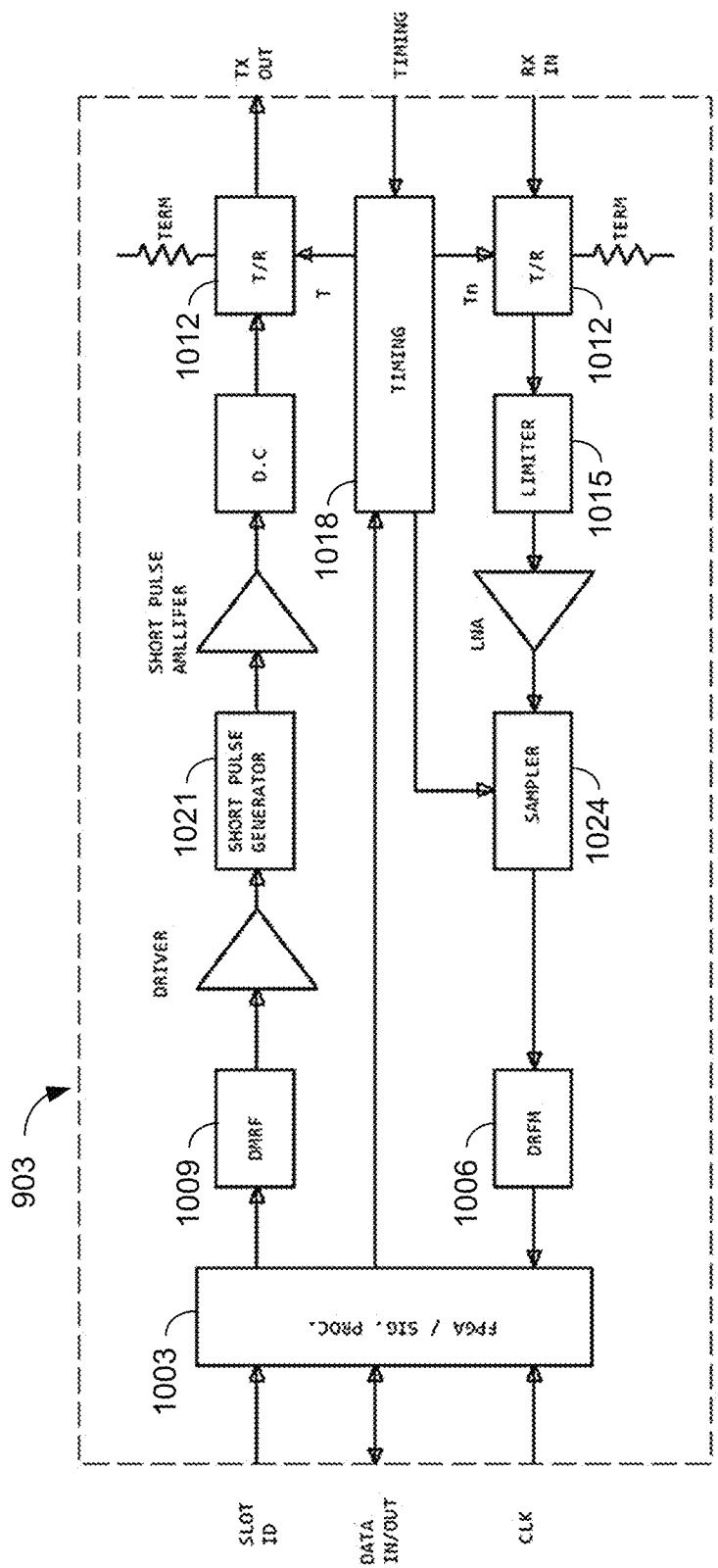

Referring now to FIGS. 9 and 10, shown is an example of a system for precursor based penetrating radar. The system architecture can be configured to generate and process sub-precursors thru a short pulse, multi-carrier transceiver, which can include a robust and dynamic RF (radio frequency) front end and a state-of-the-art processing unit. FIG. 10 illustrates an example of a transceiver module 903 that can be utilized in the RF front end 900 shown in FIG. 9. By utilizing a modular system approach, the system can allow for parallel expansion to increase the system resolution. Digitally configurable coherent transmit and receive path timing generation is ensured by utilizing a master timing generator 915 (FIG. 9) that can allow for on-the-fly system configurations to meet or adapt to mission requirements. This would allow for a single RF front end supporting a multitude of electronic systems with a single agile RF front end.

The RF front end 900 of FIG. 9 can be modular to allow for channel expansion and the use of individual slot transceiver modules 900, which can be sampled independently of each other. As shown in FIG. 9, the system can include a distributed RF front end 900 configured for direct RF to memory (DRFM) 1006 (FIG. 1)) and direct memory to RF (DMRF) 1009 (FIG. 10). The RF front end 900 can be interfaced to a field programmable gate array (FPGA) or other processing circuitry via multiple high speed data lanes (e.g., JESDES204B (or current standard) standard serial data lanes) capable of Nyquist rates per lane. One or more processors can be included within the FPGA. For example, incorporated within the FPGA can be multiple multi-core signal processors.

In various implementations, the transceiver slot modules 903 can be housed within a mainframe that can contain a group combiner 906, a group spliter 909, a group transmit/receive (T/R) switch 912, and the master timing generator 915. A correlator 918 provides a data interface for the slot transceiver modules 903. In the transmit RF path, signals from the RF transceivers 903 are applied to the RF n-port combiner 906, which can include integrated amplification, and the combined RF signal is output to the transmit antenna via the group T/R switch 912 in a quasi-static configuration.

FIG. 10 shows a schematic diagram illustrating an example of the slot transceiver modules 903 of FIG. 9. The transceiver modules 903 can be slot transceiver modules that are slot addressable to provide the parallel expansion needed to configure the system to a multi-carrier architecture, which is needed to increase the resolution of the system. The transceiver modules 903 can be configurable to allow slot 1 to slot n to be configured for different carrier frequencies. The slot transceiver modules 903 can have an RF tuning range of, e.g., 30 MHz to 6400 MHz. The carrier frequency band can be expanded through use of an external local oscillator (LO) port. For example, by using a 6400 MHz external LO signal, the RF tuning can be extended up to, e.g., 12.8 GHz. The transceiver modules 903 contain the ADC's and DAC's, bidirectional serial lane logic, memory and signal processing necessary for the slot transceiver's 903 to independently process a single carrier. The slot transceiver 903 would also contain all the RF circuitry including a T/R switch needed to function as a distributed slot transceiver for a given carrier frequency, or as a multi-carrier slot transceiver 903 configured to hop between multi-carrier frequencies. This approach allows for dual antenna configurations. Both bi-static and quasi-static are shown to allow for directed variable inclination angles.

An upfront RF sampling detector can be included, allowing the conservation of signal processing by limiting the sampling band width of the signal processors. This allows the system to zoom in on different sub-precursors within the receive window and time gate unwanted signals.

The slot transceiver module's 903 signal processing logic 1003 communicates with the correlator 918 (FIG. 9) through high speed bidirectional serial lanes capable of Nyquist rates, and drive and capture processed data from the DMRF 1009 (direct memory to RF) and DRFM 1006 (direct RF to memory). The slot transceiver waveform generated by the DMRF 1009 can be amplified prior to being applied to a short pulse generator 1021 to generate a very fast leading edge. The generated pulse waveform could also be further amplified by a short pulse amplifier, which can be directed to the T/R switch 1012 through a directional coupler.

The slot transceiver module 903 can contain a sampled transmit RF feedback path to the timing unit 1018 prior to the T/R switch 1012. This allows for detection of the leading edge of the transmitted waveform. The transmitted pulse is sampled by the timing unit 1018 within the slot transceiver 903 where it is applied with a fixed delay, followed by a variable delay. The timing unit 1018 also receives timing from the signal processing logic 1003 and a master timing clock from the master timing generator 915 (FIG. 9).

Referring back to FIG. 9, the RF transmit waveform from the slot transceiver modules 903 are input to the RF multi-port combiner 906 located within the mainframe where the individual carriers are combined into a single RF transmit signal. The combined RF signal from the multi-input RF combiner 906 can then be further amplified prior to being applied to the group T/R switch matrix 912, which supplied the RF transmit signal to the antenna. The T/R switch matrix 912 can be configured for quasi-static or bi-static antenna configurations.

After transmission of the RF transmit signal, a return is received by the RF front end 900 via the transmit and receive antennas. The receive RF signal from the antenna is applied to the T/R switch matrix 912. The gated receive signal output of the T/R switch matrix 912 is then applied to the multi-port RF spliter 909, which can include distributed low noise amplification prior to being applied to a series of LNA's located within the mainframe. In the quasi-static antenna configuration, the receive antenna directly feeds the mainframe receive input and relies on the T/R switch of the slot transceivers 903. In a mono-static antenna configuration, the group T/R switch 912 (located in the mainframe 900) can be used to connect the transmit and receive antennas. The receive signal is feed to the divide-by-n RF spliter 909, which can include integrated gain stages, and which outputs the received signal to a series of low noise amplifiers (LNAs) boosting the signal. The LNAs provide the n-channels to the separate slot transceiver modules 903.

As shown in FIG. 10, the received RF signal (RX IN) enters the slot transceiver 903 and is applied to the receive T/R switch 1012. During the receive time. The output of the T/R switch 1012 is limited by limiter 1015 to protect from excessive RF levels applied to the LNA. The output of the LNA is applied to the RF sampler 1024 where the signal is time gated and sampled during the receive period.

The sampled signal, captured during the receive window is applied to the DRFM 1006 where the signal is digitized with multiple high dynamic range continuous-time sigma-delta analog-to-digital converters which provide inherent anti-aliasing. The combination of the direct conversion architecture, which does not suffer from out-of-band image mixing, and the lack of aliasing relaxes the requirements of the RF filters as compared to traditional IF receivers.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
  transmitting, via a radar system, a pulsed radio frequency (RF) signal comprising a Brillouin precursor and a plurality of sub-precursors, where the Brillouin precursor and each of the plurality of sub-precursors are orthogonal to each other;
  receiving, via the radar system, a return signal associated with the pulsed RF signal, the return signal being a plurality of orthogonal precursors having no exponential decay; and
  sampling the return signal during a receive window generated based upon a transmit time of the pulsed RF signal and a receive time of the return signal, where a combination of the plurality of orthogonal precursors sharpen an impulse response function of the radar system.

2. The method of claim 1, wherein the plurality of orthogonal precursors is a sequence of precursors, the sequence comprising three or more precursors.

3. The method of claim 1, wherein the pulsed RF signal is transmitted in a range from about 30 MHz to about 6400 MHz.

4. The method of claim 3, wherein the pulsed RF signal is generated for transmission without automatic level control by at least one transceiver module.

5. The method of claim 1, wherein the transmit time is based upon a leading edge of the pulsed RF signal and the receive time is based upon a leading edge of the return signal.

6. The method of claim 1, wherein the return signal is sampled with high dynamic range continuous-time sigma-delta analog-to-digital converters to provide anti-aliasing.

7. The method of claim 1, further comprising processing the sampled return signal to identify sub-precursors in the return signal.

8. The method of claim 7, wherein the sampled return signal is processed without filtering.

9. The method of claim 1, wherein the combination of the plurality of orthogonal precursors comprises N orthogonal precursors, and system resolution based on a combination of the N plurality of orthogonal precursors exceeds resolution of the Brillouin precursor alone by a factor of N.

10. A radio frequency (RF) system, comprising:
  an RF front end configured to:
    generate a pulsed RF signal comprising a Brillouin precursor and a plurality of sub-precursors, where the Brillouin precursor and each of the plurality of sub-precursors are orthogonal to each other, the pulsed RF signal transmitted via an antenna communicatively coupled to the RF front end;
    receive a return signal associated with the pulsed RF signal, the return signal comprising a plurality of orthogonal precursors exhibiting no exponential decay; and
    sample the return signal during a receive window generated based upon a transmit time of the pulsed RF signal and a receive time of the return signal, where a combination of the plurality of orthogonal precursors sharpen an impulse response function of the RF system.

11. The RF system of claim 10, wherein the RF front end comprises at least one transceiver module communicatively coupled to the antenna, the at least one transceiver module comprising circuitry that generates the pulsed RF signal for transmission via the antenna without filtering.

12. The RF system of claim 11, wherein the pulsed RF signal is transmitted in a range from about 30 MHz to about 6400 MHz.

13. The RF system of claim 11, wherein the pulsed RF signal is generated by a short pulse generator of the at least one transceiver module, the pulsed RF signal generated for transmission without automatic level control by the at least one transceiver module.

14. The RF system of claim 11, wherein a timing unit of the at least one transceiver module is configured to control the receive window for sampling the return signal.

15. The RF system of claim 14, wherein the return signal is sampled without filtering the return signal prior to sampling.

16. The RF system of claim 11, wherein the RF front end comprises a plurality of transceiver modules.

17. The RF system of claim 16, wherein the RF front end comprises a combiner that combines pulsed RF signals generated by the plurality of transceiver modules for transmission.

18. The RF system of claim 16, wherein the RF front end comprises a spliter that divides the return signal for distribution to the plurality of transceiver modules for sampling and processing.

19. The RF system of claim 11, wherein the at least one transceiver module comprises signal processing circuitry configured to identify sub-precursors in the return signal.

* * * * *